US011150775B2

(12) United States Patent
Lee et al.

(10) Patent No.: US 11,150,775 B2
(45) Date of Patent: Oct. 19, 2021

(54) ELECTRONIC DEVICE AND METHOD FOR CONTROLLING SCREEN DISPLAY USING TEMPERATURE AND HUMIDITY

(71) Applicant: Samsung Electronics Co., Ltd., Suwon-si (KR)

(72) Inventors: Boyoung Lee, Seoul (KR); Hyebin Park, Seoul (KR); Jiyoung Kang, Suwon-si (KR); Minwook Na, Suwon-si (KR); Jongwoo Shin, Seongnam-si (KR); Yumi Ahn, Hanam-si (KR); Hyunwoo Yoo, Seoul (KR); Jungwoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 16/014,409

(22) Filed: Jun. 21, 2018

(65) Prior Publication Data
US 2018/0300019 A1 Oct. 18, 2018

Related U.S. Application Data

(63) Continuation of application No. 14/208,544, filed on Mar. 13, 2014, now abandoned.

(30) Foreign Application Priority Data

Mar. 14, 2013 (KR) .................. 10-2013-0027595

(51) Int. Cl.
*G06F 3/0481* (2013.01)
*G06F 3/0488* (2013.01)

(52) U.S. Cl.
CPC .......... *G06F 3/0481* (2013.01); *G06F 3/0488* (2013.01); *G06F 3/04817* (2013.01);
(Continued)

(58) Field of Classification Search
CPC ........... H04L 29/0809; G06F 17/30873; G06F 3/0482; G06F 3/0481; G06F 3/04817; G06F 3/04883
See application file for complete search history.

(56) References Cited

U.S. PATENT DOCUMENTS 6,559,828 B1   5/2003  Impio
8,948,819 B2   2/2015  Yun et al.
(Continued)

FOREIGN PATENT DOCUMENTS

CN   102279710 A   12/2011
CN   102591563 A   7/2012
(Continued)

OTHER PUBLICATIONS

Chinese Office Action dated Oct. 9, 2018, issued in a counterpart Chinese application No. 201410095604.9.
(Continued)

*Primary Examiner* — Toan H Vu
(74) *Attorney, Agent, or Firm* — Jefferson IP Law, LLP

(57) ABSTRACT

A background image is displayed on a touch screen of an electronic device. Overlapped with the background image, a semitransparent layer is displayed. When a touch and drag action is detected from the semitransparent layer, the transparency of a touch and drag region is changed. Transparency of the semitransparent layer may be changed according to temperature or humidity.

22 Claims, 46 Drawing Sheets

(52) U.S. Cl.
CPC ............ *G06F 2203/04804* (2013.01); *H04M 2250/12* (2013.01); *H04M 2250/22* (2013.01)

(56) References Cited

U.S. PATENT DOCUMENTS

| | | |
|---|---|---|
| 2005/0275633 A1 | 12/2005 | Verada |
| 2008/0246778 A1 | 10/2008 | Ham et al. |
| 2009/0309711 A1 | 12/2009 | Adappa et al. |
| 2010/0017737 A1 | 1/2010 | Berger |
| 2010/0088623 A1 | 4/2010 | Ichino |
| 2010/0146384 A1 | 6/2010 | Peev et al. |
| 2010/0188353 A1 | 7/2010 | Yoon et al. |
| 2010/0210357 A1 | 8/2010 | Slough et al. |
| 2010/0299638 A1 | 11/2010 | Choi |
| 2010/0315359 A1 | 12/2010 | Seong et al. |
| 2011/0028186 A1 | 2/2011 | Lee et al. |
| 2011/0059775 A1 | 3/2011 | Choi et al. |
| 2011/0076992 A1 | 3/2011 | Chou et al. |
| 2011/0234626 A1* | 9/2011 | Seong ............... H04N 1/00167 345/619 |
| 2011/0256848 A1 | 10/2011 | Bok et al. |
| 2012/0046079 A1 | 2/2012 | Kim et al. |
| 2012/0084691 A1 | 4/2012 | Yun |
| 2012/0084734 A1 | 4/2012 | Wilairat |
| 2012/0131492 A1 | 5/2012 | Jung |
| 2012/0249584 A1 | 10/2012 | Naruse |
| 2012/0320622 A1 | 12/2012 | Sanders |
| 2013/0033591 A1 | 2/2013 | Takahashi et al. |
| 2013/0047079 A1 | 2/2013 | Kroeger et al. |
| 2013/0082945 A1 | 4/2013 | Jo |
| 2013/0169568 A1* | 7/2013 | Park ..................... G06F 3/0416 345/173 |
| 2013/0174094 A1 | 7/2013 | Heo et al. |
| 2013/0215088 A1* | 8/2013 | Son ...................... G06F 3/0488 345/204 |
| 2013/0222283 A1* | 8/2013 | Yun ...................... G06F 3/0483 345/173 |
| 2013/0232445 A1 | 9/2013 | Ording et al. |
| 2013/0232446 A1 | 9/2013 | Lin |
| 2013/0283165 A1 | 10/2013 | Hua |
| 2014/0109001 A1 | 4/2014 | Lounch et al. |
| 2014/0168076 A1* | 6/2014 | Hicks .................... G06F 3/0488 345/157 |
| 2014/0195957 A1* | 7/2014 | Bang .................. G06F 3/04812 715/773 |
| 2014/0247233 A1* | 9/2014 | Cho ....................... G06F 3/0488 345/173 |
| 2015/0077377 A1* | 3/2015 | Han ...................... G06F 1/1694 345/173 |
| 2015/0156073 A1* | 6/2015 | Bailiang ................. H04W 4/33 715/736 |
| 2015/0200947 A1* | 7/2015 | Takishita .............. G06F 1/1616 715/743 |
| 2015/0242097 A1 | 8/2015 | Forstall et al. |
| 2016/0004429 A1 | 1/2016 | Berstein et al. |
| 2016/0026333 A1* | 1/2016 | Kim ........................ G06F 3/044 345/173 |
| 2016/0195936 A1* | 7/2016 | LaFave ............... G06F 3/04845 345/168 |
| 2016/0210027 A1* | 7/2016 | LeVee .................. G06F 3/0482 |
| 2017/0177384 A1* | 6/2017 | Aebi ..................... G06F 3/0482 |

FOREIGN PATENT DOCUMENTS

| | | |
|---|---|---|
| CN | 102662571 A | 9/2012 |
| CN | 102844989 A | 12/2012 |
| JP | 09-146447 A | 6/1997 |
| JP | 2002-260010 A | 9/2002 |
| JP | 2012-249978 A | 12/2012 |
| KR | 10-2010-0083396 A | 7/2010 |
| KR | 10-2011-0026319 A | 3/2011 |
| KR | 10-2012-0018446 A | 3/2012 |
| RU | 2002106232 A | 9/2003 |
| TW | 201112021 A | 4/2011 |

OTHER PUBLICATIONS

Korean Office Action dated Sep. 20, 2019, issued in Korean Application No. 10-2013-0027595.

Egaku, [iPhone, iPad] iFoggy: Have fun drawing on foggy glass, even when you are not in the bathroom, APPBANK, Japan, Jul. 15, 2012.

* cited by examiner

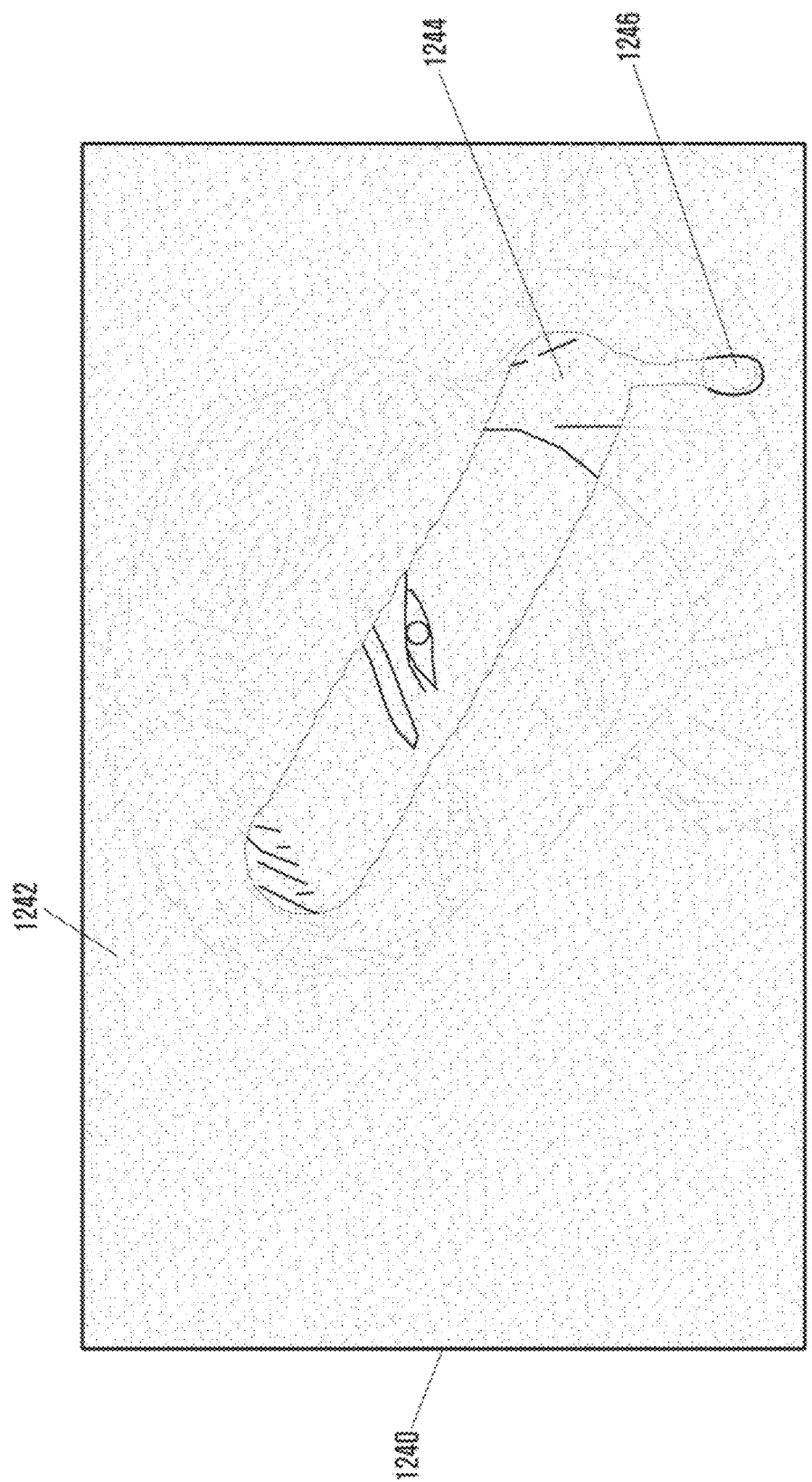

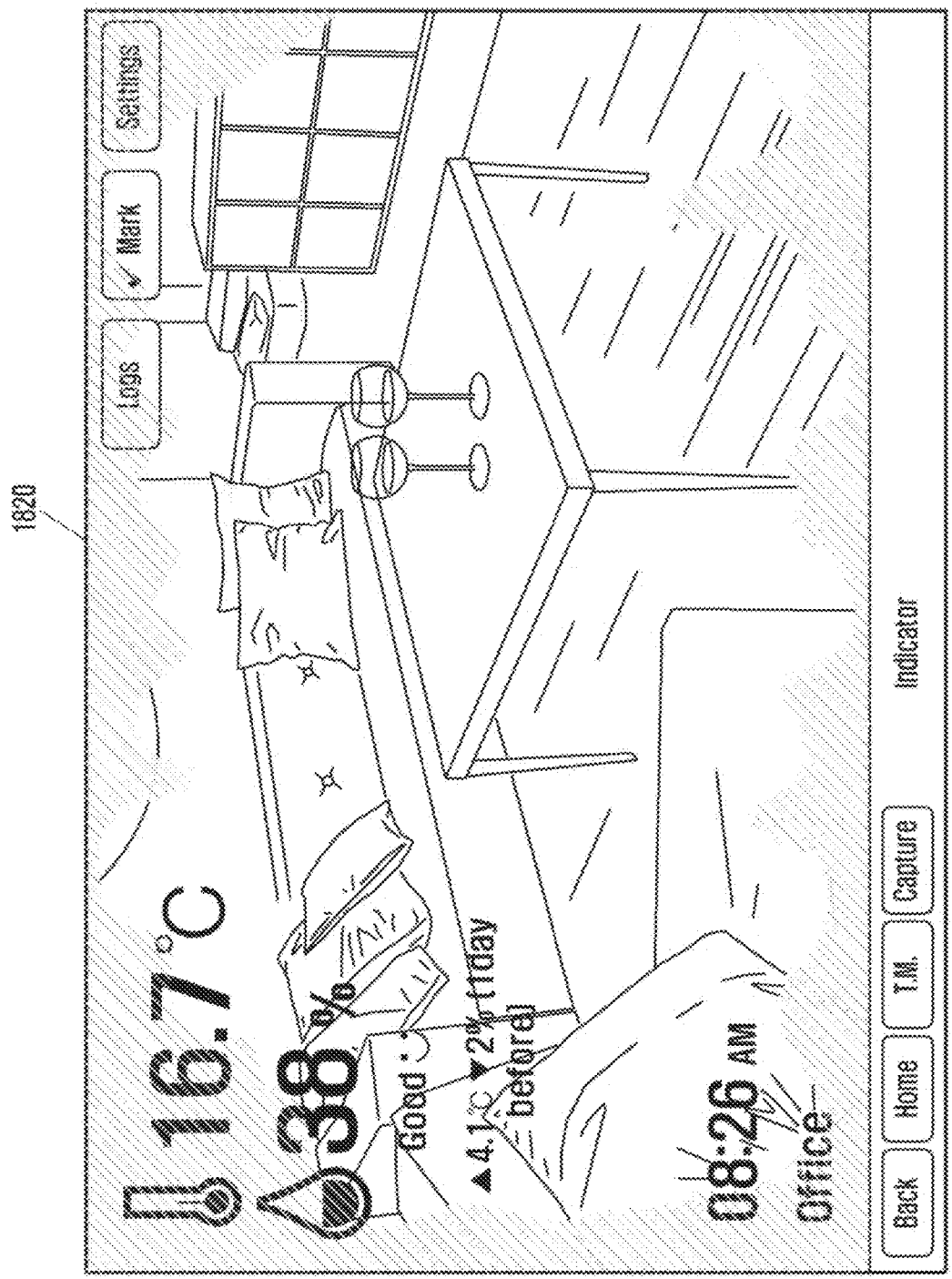

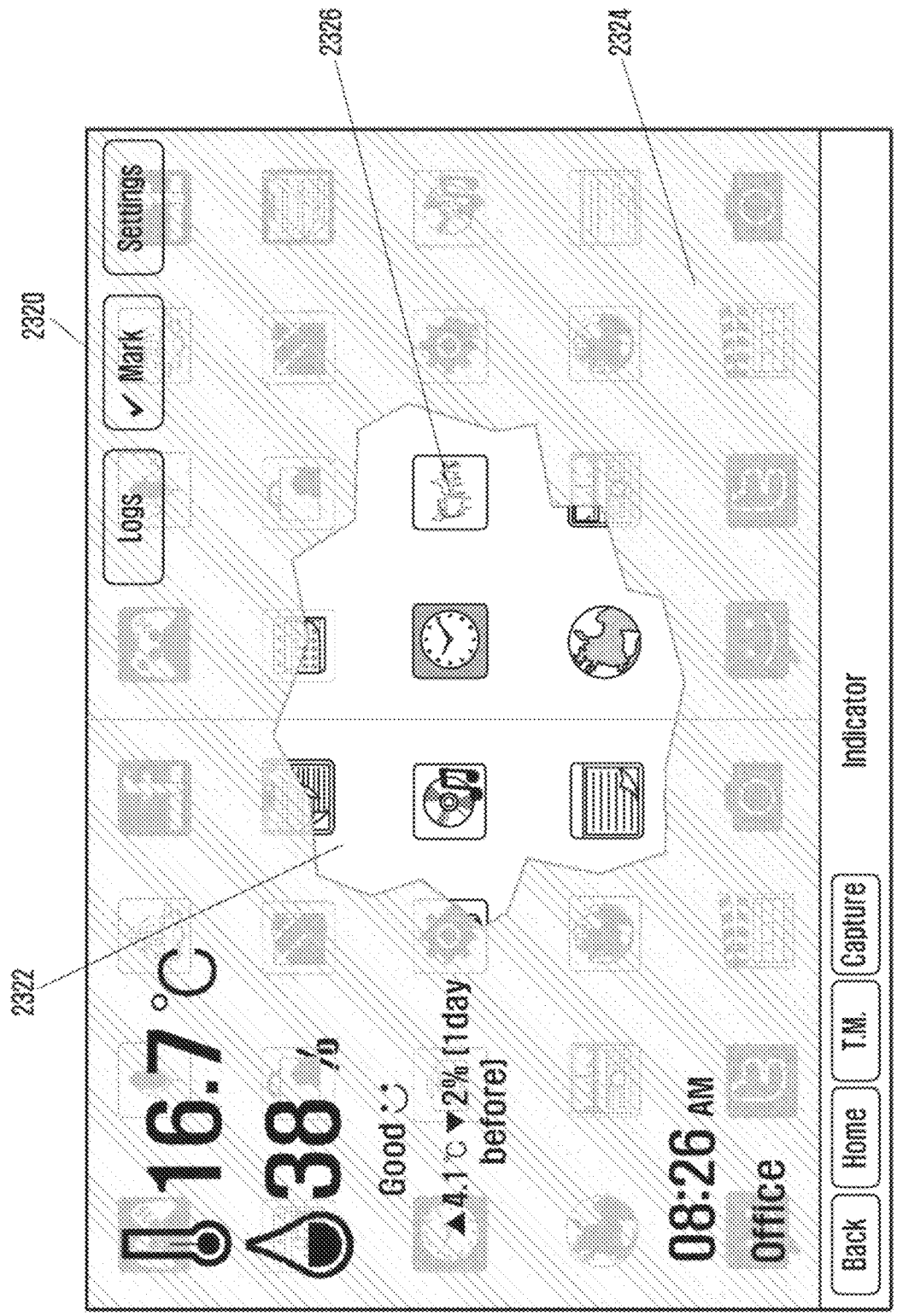

ELECTRONIC DEVICE AND METHOD FOR CONTROLLING SCREEN DISPLAY USING TEMPERATURE AND HUMIDITY

CROSS-REFERENCE TO RELATED APPLICATION(S)

This application is a continuation application of prior application Ser. No. 14/208,544, filed on Mar. 13, 2014, and was based on and claimed priority under 35 U.S.C. § 119(a) of a Korean patent application filed on Mar. 14, 2013 in the Korean Intellectual Property Office and assigned Serial number 10-2013-0027595, the entire disclosure of which is hereby incorporated by reference.

TECHNICAL FIELD

The present disclosure relates to a display control for a screen of an electronic device having a touch screen. More particularly, the present disclosure relates to an electronic device and method for controlling a display of images and objects on a touch screen, based on at least one of temperature and humidity.

BACKGROUND

Nowadays a touch screen is used for various electronic devices in order to display graphic elements and text and to offer a user interface that allows an interaction between a user and an electronic device. A touch screen detects contact on a surface thereof and reacts to such contact. Normally a touch screen may display thereon one or more soft keys, one or more menu items, and any other object for a user interface. User's contact with any object on a touch screen may cause an interaction between a user and an electronic device.

A touch screen provides an intuitive user interface. Therefore, a touch screen has been widely used as a display and input device for many types of mobile devices such as mobile phones or smart phones.

Recently a smart phone uses a touch screen as a basic input/output device and has various sensors, such as a temperature sensor, a humidity sensor, and an optical sensor, for sensing external environments. By combining an intuitive interface of a touch screen with various sensors, a smart phone may offer natural and enhanced experiences to a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for a screen display control that allows a display of a semitransparent layer overlapped with a background image on a touch screen.

Another aspect the present disclosure is to provide an electronic device and method for a screen display control that can change the transparency of a touch and drag region in response to a user input based on a touch and drag on a semitransparent layer.

Another aspect the present disclosure is to provide an electronic device and method for a screen display control that can vary the transparency of a semitransparent layer according to at least one of temperature and humidity.

According to a first aspect of the present invention there is provided an electronic device comprising: a touch screen configured to display an image and to detect a user input; and a control unit configured to control the touch screen to display a first layer overlapped with the image; wherein when a user input is detected in a partial region of the first layer, the control unit is further configured to change the transparency of the partial region.

According to a second aspect of the present invention there is provided a display control method for an electronic device having a touch screen, the method comprising: displaying a first layer overlapped with an image displayed on the touch screen; detecting a user input on the touch screen; and changing the transparency of a partial region of the first layer in which the user input is detected.

In accordance with an aspect of the present disclosure, an electronic device is provided. The electronic device includes a display unit configured to display an image and having a touch screen for detecting a user input, and a control unit configured to control the touch screen to display a first layer overlapped with the image. In this electronic device, when the user input is detected in a partial region of the first layer, the control unit is further configured to change transparency of the partial region.

The electronic device may further comprise a temperature sensor, and the control unit may be further configured to determine temperature based on information received from the temperature sensor, to control the first layer to display a water vapor image when the determined temperature is higher than a predefined temperature, and to control the first layer to display a frost image when the determined temperature is lower than the predefined temperature.

The control unit may be further configured to change transparency of the entire region of the first layer according to variations of the determined temperature.

The control unit may be further configured to control the first layer to display a water drop object after an elapse of a given time. The control unit may be further configured to control the water drop object to be displayed as if it moves in the direction of gravity. The control unit may be further configured to control the water drop object to be displayed at a removal point of the user input.

The control unit may be further configured to change transparency of the user input detected region as time passes.

The electronic device may further comprise a humidity sensor, and the control unit may be further configured to change transparency of the first layer in response to a signal received from the humidity sensor.

The control unit may be further configured to control the first layer to display an accumulated frost object at a removal point of the user input when the frost image is displayed.

The control unit may be further configured to control the touch screen to display a second layer overlapped with the first layer, the second layer having an opaque region for displaying information.

The control unit may be further configured to determine temperature based on data received from an external entity, to control the first layer to display a water vapor image when the determined temperature is higher than a predefined temperature, and to control the first layer to display a frost image when the determined temperature is lower than the predefined temperature.

The control unit may be further configured to change transparency of the entire region of the first layer according to weather information. The weather information may include at least one of temperature and humidity.

The first layer may have at least two attributes which are determined according to temperature.

The control unit may be further configured to assign a first attribute to the first layer when the temperature is higher than a predefined temperature, and to assign a second attribute to the first layer when the temperature is lower than the predefined temperature.

In accordance with another an aspect of the present disclosure, an electronic device is provided. The electronic device includes a display unit configured to display an image and having a touch screen for detecting a user input, and a control unit configured to control the touch screen to display a semitransparent layer overlapped with the image. In this electronic device, when the user input is detected in a partial region of the semitransparent layer, the control unit is further configured to change transparency of the partial region.

In accordance with another an aspect of the present disclosure, an electronic device is provided. The electronic device includes a display unit configured to display a user interface and having a touch screen for detecting a user input, and a control unit configured to keep a lock state of the user interface by controlling the touch screen to display a semitransparent layer overlapped with the user interface, to change transparency of a partial region of the semitransparent layer when the user input is detected in the partial region, and to release the lock state of the user interface when the partial region occupies a specific percentage or more of the entire region of the touch screen.

In accordance with another an aspect of the present disclosure, an electronic device is provided. The electronic device includes a display unit configured to display a plurality of icons for executing applications and to have a touch screen for detecting a user input, and a control unit configured to disallow a selection of the icons by controlling the touch screen to display a semitransparent layer overlapped with the icons, and to control at least one of the icons to be in a selectable state by changing transparency of a partial region of the semitransparent layer when the user input is detected in the partial region.

In accordance with another an aspect of the present disclosure, a method for a display control for a screen of an electronic device having a touch screen is provided. The method includes a first layer overlapped with an image displayed on the touch screen, detecting a user input in the touch screen, and changing transparency of a partial region of the first layer in which the user input is detected.

The screen display control method may further comprise determining temperature, and displaying a water vapor image on the first layer when the determined temperature is higher than a predefined temperature, and displaying a frost image on the first layer when the determined temperature is lower than the predefined temperature.

The screen display control method may further comprise changing transparency of the entire region of the first layer according to variations of the determined temperature.

The screen display control method may further comprise displaying a water drop object on the first layer after an elapse of a given time.

The screen display control method may further comprise displaying the water drop object as if it moves in the direction of gravity.

The screen display control method may further comprise displaying the water drop object at a removal point of the user input.

The screen display control method may further comprise changing transparency of the user input detected region as time passes.

The screen display control method may further comprise detecting humidity, and changing transparency of the first layer according to the detected humidity.

The screen display control method may further comprise displaying an accumulated frost object at a removal point of the user input on the first layer when the frost image is displayed.

The screen display control method may further comprise displaying a second layer overlapped with the first layer on the touch screen, the second layer having an opaque region for displaying information.

The screen display control method may further comprise receiving temperature, and displaying a water vapor image on the first layer when the received temperature is higher than a predefined temperature, and displaying a frost image on the first layer when the received temperature is lower than the predefined temperature.

The screen display control method may further comprise changing transparency of the entire region of the first layer according to weather information. The weather information may include at least one of temperature and humidity.

The first layer may have at least two attributes which are determined according to temperature.

The screen display control method may further comprise assigning a first attribute to the first layer when the temperature is higher than a predefined temperature, and assigning a second attribute to the first layer when the temperature is lower than the predefined temperature.

In accordance with another an aspect of the present disclosure, a method for a display control for a screen of an electronic device having a touch screen is provided. The method includes an image on the touch screen, displaying a semitransparent layer overlapped with the image, detecting a user input in the touch screen, and changing transparency of a partial region of the semitransparent layer in which the user input is detected.

In accordance with another an aspect of the present disclosure, a method for a display control for a screen of an electronic device having a touch screen is provided. The method includes a user interface on the touch screen, keeping a lock state of the user interface by controlling the touch screen to display a semitransparent layer overlapped with the user interface, changing transparency of a partial region of the semitransparent layer when a user input is detected in the partial region, and releasing the lock state of the user interface when the partial region occupies a specific percentage or more of the entire region of the touch screen.

In accordance with another an aspect of the present disclosure, a method for a display control for a screen of an electronic device having a touch screen is provided. The method includes a plurality of icons for executing applications on the touch screen, disallowing a selection of the icons by controlling the touch screen to display a semitransparent layer overlapped with the icons, and controlling at least one of the icons to be in a selectable state by changing transparency of a partial region of the semitransparent layer when a user input is detected in the partial region.

Another aspect of the invention provides a computer program comprising instructions arranged, when executed, to implement a method in accordance with any one of the above-described aspects. A further aspect provides machine-readable storage storing such a program.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 12A and 12B show screenshots illustrating the movement of a water drop object after an elapse of a given time from a display of the water drop object on a touch screen of an electronic device according to an embodiment of the present disclosure;

FIGS. 18A, 18B, and 18C show screenshots illustrating a layer having been changed in opacity in a case of a touch and drag action taken at about 90% regions on a touch screen of an electronic device according to an embodiment of the present disclosure;

FIGS. 23A, 23B, and 23C show screenshots illustrating a process of releasing a lock state of a user interface at a partial region on a touch screen of an electronic device according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a layer" includes reference to one or more of such layers.

Figure 1:
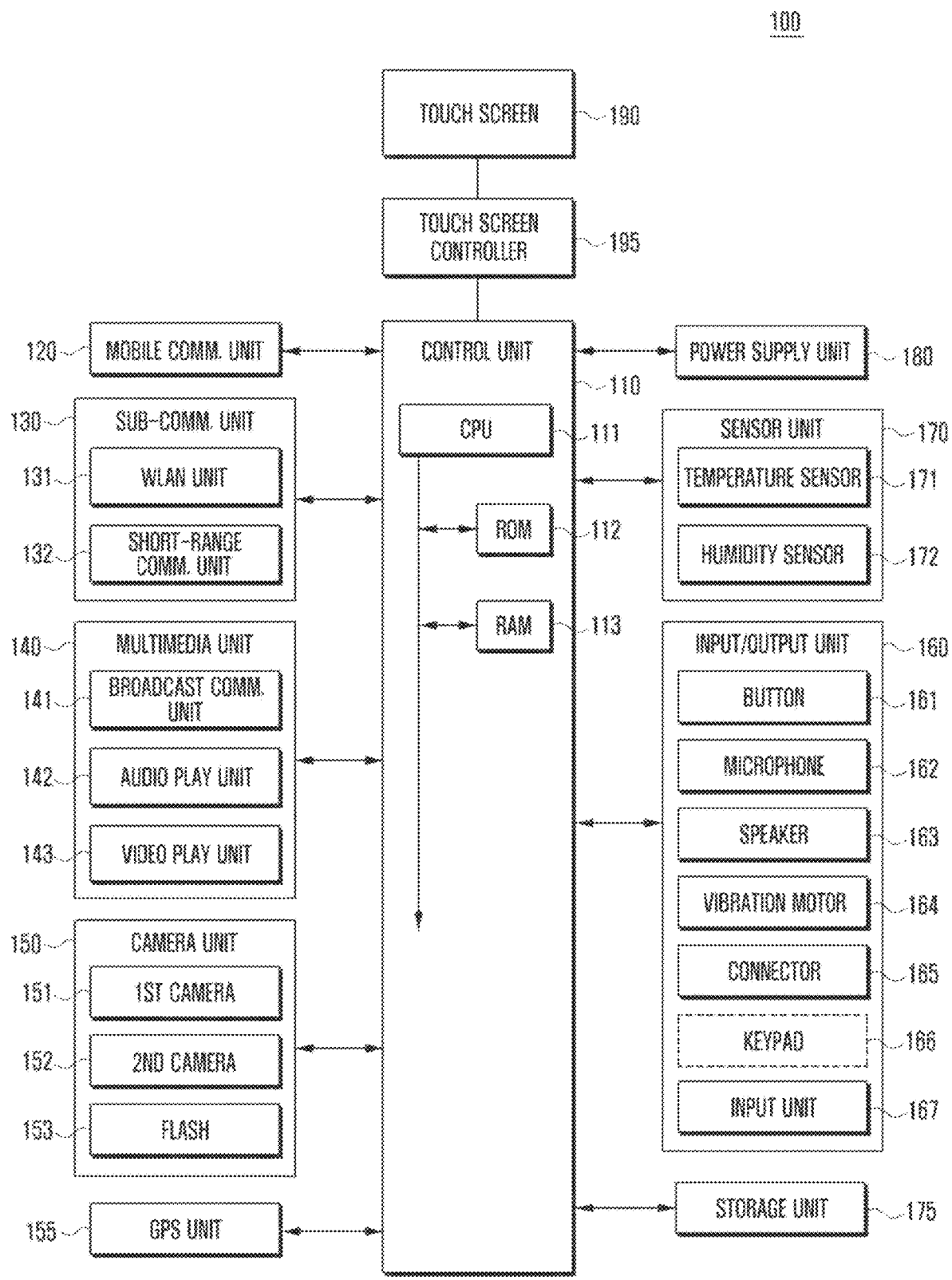
FIG. 1 is a block diagram illustrating an electronic device according to an embodiment of the present disclosure.

FIG. 1 is a block diagram illustrating an electronic device according to an embodiment of the present disclosure.

Referring to FIG. 1, the electronic device 100 may be connected to any external device (not shown), using a mobile communication unit 120, a sub-communication unit 130, and a connector 165. An external device may be a mobile phone, a smart phone, an input device, a tablet Personal Computer (PC), a server, or any other electronic device. The electronic device 100 is portable, is capable of transmission/reception of data, and may have at least one touch screen. The electronic device 100 may be a mobile phone, a smart phone, a tablet PC, a 3 Dimensional (3D) TeleVision (TV), a smart TV, a Light Emitting Diode (LED) TV, a Liquid Crystal Display (LCD) TV, or any other device that allows data to be transmitted to or received from a peripheral device or other remote device.

The electronic device 100 includes a touch screen 190 and a touch screen controller 195, both of which may collectively be a display unit (not shown).

Additionally, the electronic device 100 includes a control unit 110, the mobile communication unit 120, the sub-communication unit 130, a multimedia unit 140, a camera unit 150, a Global Positioning System (GPS) unit 155, an input/output unit 160, a sensor unit 170, a storage unit 175, and a power supply unit 180. The sub-communication unit 130 includes at least one of a Wireless Local Area Network (WLAN) unit 131 and a short-range communication unit 132. The multimedia unit 140 includes at least one of a broadcast communication unit 141, an audio play unit 142, and a video play unit 143. The camera unit 150 includes at least one of the first camera 151, the second camera 152, and a flash 153. The input/output unit 160 includes at least one of a button 161, a microphone 162, a speaker 163, a vibration motor 164, the connector 165, a keypad 166, and an input unit 167. The sensor unit 170 includes a temperature sensor 171 and a humidity sensor 172.

The control unit 110 may include a Central Processing Unit (CPU) 111, a Read Only Memory (ROM) 112 that stores a control program for controlling the electronic device 100, and a Random Access Memory (RAM) 113 that stores a signal or data received from any external entity or is used as a storage region for a task performed in the electronic device 100.

The control unit 110 controls general operations of the electronic device 100 and flows of signals between the above-mentioned internal components 120 to 195, and also performs a function to process data. The control unit 110 controls the supply of electric power from the power supply unit 180 to the above-mentioned internal components 120 to 195. Further, the control unit 110 executes an Operating System (OS) and an application stored in the storage unit 175.

The CPU 111 may include a Graphic Processing Unit (GPU) (not shown) The CPU 111 may be a System-on-Chip (SoC) that contains a core (not shown) and the GPU. The CPU 111 may include a single core, a dual core, a triple core, a quad core, or any other multi core. The CPU 111, the ROM 112 and the RAM 113 may be connected to each other through an internal bus.

The control unit 110 may control the mobile communication unit 120, the sub-communication unit 130, the multimedia unit 140, the camera unit 150, the GPS unit 155, the input/output unit 160, the sensor unit 170, the storage unit 175, the power supply unit 180, the touch screen 190, and the touch screen controller 195.

The mobile communication unit 120 enables the electronic device 100 to be connected to any external device through a mobile communication, using one or more antennas (not shown) under the control of the control unit 110. The mobile communication unit 120 transmits or receives a wireless signal for a voice call, a video call, a Short Message Service (SMS), a Multimedia Message Service (MMS), or a data communication to or from a mobile phone, a smart phone, a tablet PC or any other electronic device.

The sub-communication unit 130 may include at least one of the WLAN unit 131 and the short-range communication unit 132. For example, the sub-communication unit 130 may include the WLAN unit 131 only, the short-range communication unit 132 only, or both.

The WLAN unit 131 may be connected to the Internet through an Access Point (AP) (not shown) under the control of the control unit 110. The WLAN unit 131 supports related standards, such as Institute of Electrical and Electronics Engineers (IEEE) 802.11x. The short-range communication unit 132 may perform a short-range communication between the electronic device 100 and any external device under the control of the control unit 110. For example, a short-range communication may be, but is not limited to, Bluetooth, Infrared Data Association (IrDA), or Near Field Communication (NFC).

The electronic device 100 may include at least one of the mobile communication unit 120, the WLAN unit 131, and the short-range communication unit 132. For example, the electronic device 100 may have any combination of the mobile communication unit 120, the WLAN unit 131, and the short-range communication unit 132. In various embodiments of this disclosure, "a communication unit" is the term used to include the mobile communication unit 120 and the sub-communication unit 130.

The multimedia unit 140 may include the broadcast communication unit 141, the audio play unit 142, or the video play unit 143. The broadcast communication unit 141 may receive a broadcasting signal (e.g., a TV broadcasting signal, a radio broadcasting signal, or a data broadcasting signal) and any additional information (e.g., Electric Program Guide (EPG) or Electric Service Guide (ESG)) from a broadcasting station through a suitable antenna (not shown) under the control of the control unit 110. Then the broadcast communication unit 141 may reproduce the received signal and information, using the touch screen, a video codec unit (not shown), and an audio codec unit (not shown).

The audio play unit 142 may reproduce an audio source (e.g., an audio file having the file extension of mp3, wma, ogg, or wav) stored in the storage unit 175 or received from any external entity, using the audio codec unit under the control of the control unit 110.

The video play unit 143 may reproduce a digital video file (e.g., a file having the file extension of mpeg, mpg, mp4, avi, mov, or mkv) stored in the storage unit 175 or received from any external entity, using the video codec unit under the control of the control unit 110. Most applications that can be installed in the electronic device 100 may allow the playback of audio and/or video, using the audio codec unit and/or the video codec unit.

As will be understood by those skilled in the art, many kinds of video/audio codec units have been manufactured and sold. Additionally, the video play unit 143 may reproduce an audio source, using the video codec unit or the audio codec unit.

The multimedia unit 140 may include the audio play unit 142 and the video play unit 143, excluding the broadcast communication unit 141. In another embodiment, the audio play unit 142 and the video play unit 143 may be included in the control unit 110. In various embodiments of this disclosure, "a video codec unit" is the term used to include one or more video codec units. Similarly, "an audio codec unit" is the term used to include one or more audio codec units.

The camera unit 150 may include at least one of the first camera 151 and the second camera 152, which are disposed respectively at the front and rear sides of the electronic device 100. Each of the first and second cameras 151 and 152 may capture an image and/or record a video. Each camera 151 or 152 may have an assistant light source (e.g., the flash 153) to offer a sufficient amount of light.

The camera unit 150 may further include at least one additional camera (not shown) which is disposed near the first and second cameras 151 and 152. For example, the distance between the additional camera and the first or second camera may be within a range from 2 cm to 8 cm. This combination of cameras may allow the acquisition of a 3D image or a 3D video.

The GPS unit 155 receives radio waves from a plurality of GPS satellites (not shown) on the earth orbit. The electronic device 100 may calculate a current position, using time of arrival (ToA) from such GPS satellites to the GPS unit 155.

The input/output unit 160 may include at least one of the buttons 161, the microphone 162, the speaker 163, the vibration motor 164, the connector 165, the keypad 166, and the input unit 167.

The button 161 may be formed of a touch-sensitive virtual button rather than a mechanical button. Further, the button 161 may be displayed on the touch screen 190.

The microphone 162 receives voice or sound from the outside and creates an electric signal under the control of the control unit 110. This electric signal may be converted by the audio codec unit and then stored in the storage unit 175 or outputted through the speaker 163. The microphone 162 or more may be located at the front, lateral, and rear sides of the electronic device 100. Alternatively, the microphone 162 or more may be located at the lateral side only.

The speaker 163 may output, to the outside, any sound corresponding to various signals (e.g., a wireless signal, a broadcasting signal, and audio source, a video file, an image, etc.) from the mobile communication unit 120, the sub-communication unit 130, the multimedia unit 140, or the camera unit 150, using the audio codec unit under the control of the control unit 110. The speaker 163 may output sound (e.g., a button touch tone or a ringtone) corresponding to a particular function performed by the electronic device 100.

The vibration motor 164 may convert an electric signal into a mechanical vibration under the control of the control unit 110. For example, when a request for a voice call is received from a caller device (not shown), the vibration motor 164 operates in the case where the electronic device 100 is in a vibration mode. The vibration motor 164 or more may be used in the electronic device 100 to transfer a vibration to the whole electronic device 100 or a part thereof.

The connector 165 may be used as an interface for connecting the electronic device 100 to an external device (not shown) or a power source (not shown). Using a wired cable connected to the connector 165, the electronic device 100 may transmit data stored in the storage unit 175 to any external device or receive data from any external device under the control of the control unit 110. Additionally, using a wired cable connected to the connector 165, the electronic device 100 may receive electric power from a power source and recharge a battery (not shown) equipped therein.

The keypad 166 may receive a key input for controlling the electronic device 100 from a user. The keypad 166 may be a mechanical keypad (not shown) formed in the electronic device 100 and/or a virtual keypad (not shown) displayed on the touch screen 190. In various embodiments, a mechanical keypad may not be used depending on the performance or structure of the electronic device 100.

The input unit 167 may touch or select any object (e.g., menu, text, image, figure, icon, etc.) displayed on the touch screen 190. For example, the input unit 167 may touch the touch screen of capacitive type, resistive type, electromagnetic induction type, or ElectroMagnetic Reaction (EMR) type, or enter characters and the like through a virtual keyboard.

The sensor unit 170 may include the temperature sensor 171 for detecting the temperature of the outside and the humidity sensor 172 for detecting the humidity of the outside. Various sensors may be added to or removed from the sensor unit 170, depending on the performance of the electronic device 100. For example, a proximity sensor (not shown) for detecting the approach of something, a luminance sensor (not shown) for detecting the amount of light around the electronic device 100, an acceleration sensor (not shown) for detecting a triaxial tilt of the electronic device 100, and/or a gravity sensor for detecting the direction of gravity may be included in the sensor unit 170.

At least one sensor included in the sensor unit 170 may detect conditions of the electronic device 100 or environmental information around the electronic device 100, and then transmit a detection signal to the control unit 110.

The storage unit 175 may store signals or data inputted/outputted in connection with operations of the mobile communication unit 120, the sub-communication unit 130, the multimedia unit 140, the camera unit 150, the GPS unit 155, the input/output unit 160, the sensor unit 170, and the touch screen 190 under the control of the control unit 110. The storage unit 175 may store a specific control program for the control of the electronic device 100 or the control unit 110, various applications offered by a manufacturer or received from any external entity, a related Graphical User Interface (GUI), images used to provide such a GUI, user information, documents, database, and/or related data.

In various embodiments of this disclosure, a "storage unit" is the term used to include the storage unit 175, the ROM 112 and the RAM 113 in the control unit 110, and/or a memory card (not shown, e.g., a micro Secure Digital (SD) card or a memory card) mounted in the electronic device 100. This storage unit may be formed of nonvolatile memory, volatile memory, Hard Disk Drive (HDD), or Solid State Drive (SSD).

The power supply unit 180 may supply electric power to one or more batteries (not shown) disposed in the electronic device 100 under the control of the control unit 110. Additionally, the power supply unit 180 may receive electric power from an external power source (not shown) through a wired cable (not shown) connected to the connector 165.

The touch screen 190 may offer a user a user interface such as GUIs corresponding to various services (e.g., call, data transmission, broadcasting, taking picture, video, application, etc.). The touch screen 190 transmits analog signals corresponding to one or more touch inputs entered through a GUI to the touch screen controller 195. The touch screen 190 may receive one or more touch inputs from a user's body (e.g., finger) or the input unit 167.

In various embodiments of this disclosure, a touch is not limited to contact between the touch screen 190 and a user's body or the input unit 167, and may include any non-contact action (e.g., hovering with a detectable distance of 30 mm or less). This detectable distance may be varied depending on the performance or structure of the electronic device 100.

The touch screen 190 may be formed of resistive type, capacitive type, infrared type, or acoustic wave type.

Additionally, the touch screen 190 may include an Electromagnetic Reaction (EMR) pad capable of detecting contact of an active type stylus pen (not shown).

This pen may contain a coil therein and form a magnetic field at a certain spot of the EMR pad by means of the coil. The EMR pad may detect a touch point of the pen on the touch screen 190 by detecting the location of a magnetic field.

The touch screen controller 195 receives signals (e.g., X and Y coordinates of a touch point) corresponding to one or more touch inputs from the touch screen 190 and transmits the received signals to the control unit 110. Then the control unit 110 may control the touch screen 190, using signals received from the touch screen controller 195. For example, in response to a touch input, the control unit 110 may indicate a selection of a shortcut icon (not shown) displayed on the touch screen 190 or execute an application corresponding to the selected shortcut icon.

The control unit 110 may calculate X and Y coordinates corresponding to a touch point, using signals received from the touch screen controller 195. In various embodiments of this disclosure, the touch screen controller 195 controls the touch screen 190 and, depending on the performance or structure of the electronic device 100, may be contained in the control unit 110.

The above-discussed elements of the electronic device 100 in FIG. 1 may be essentially or optionally used depending on the performance of the electronic device 100. Additionally, as will be understood by those skilled in the art, locations of such elements may be varied according to the performance or structure of the electronic device 100.

Figure 2A:
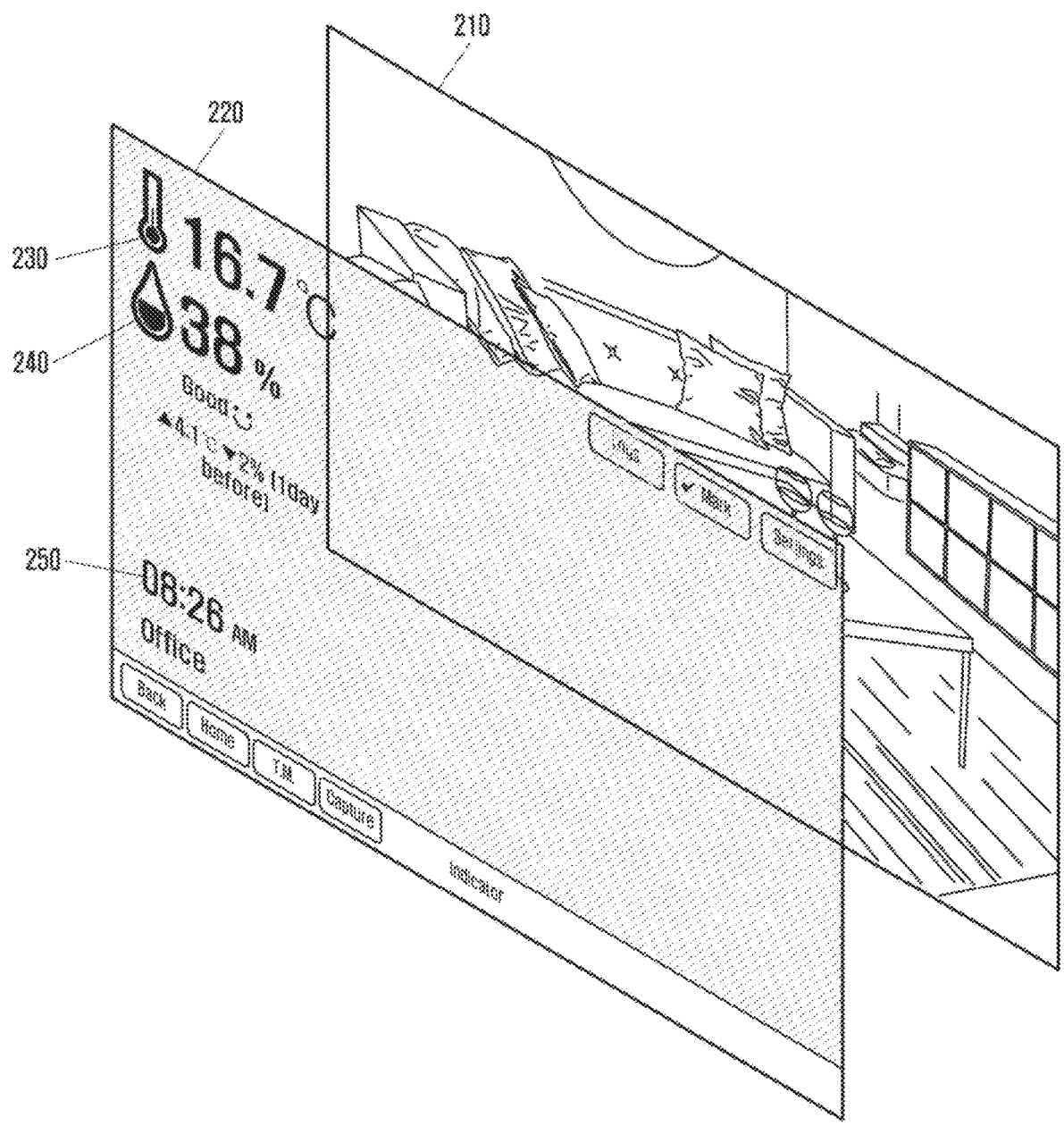
FIGS. 2A and 2B are exploded views illustrating screen layers displayed on a touch screen of an electronic device according to an embodiment of the present disclosure.
Figure 2B:
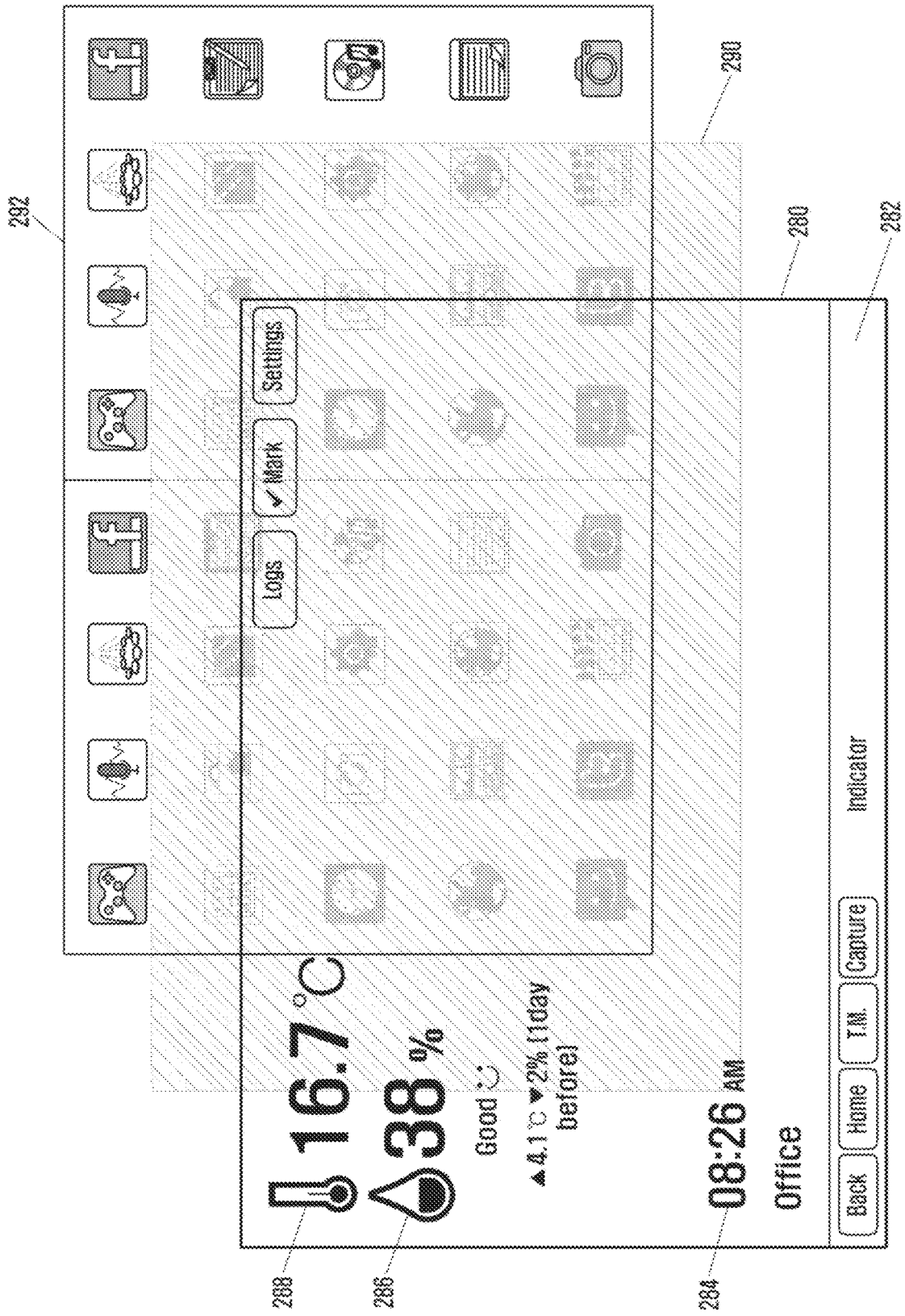

FIGS. 2A and 2B are exploded views illustrating screen layers displayed on a touch screen of an electronic device according to an embodiment of the present disclosure.

The electronic device may include the touch screen for allowing an image to be displayed and for detecting a user input. Particularly, the electronic device may display a semitransparent layer overlapped with the image. Further, the electronic device may include the control unit for changing the transparency of a part of the semitransparent layer corresponding to a specific spot on the touch screen from which a user input is detected.

Referring to FIGS. 1 and 2A, an image 210 is displayed on the touch screen 190. The image 210 may be a background image displayed in an idle state of the electronic device.

Additionally, the first layer 220 may be displayed to be overlapped with the image 210. The first image 210 may be considered to be displayed on a layer underlying the first layer 220. At least part of the first layer 220 may be in a semitransparent (or translucent) state such that the image 210 may be seen dimly through the first layer 220. Meanwhile, the first layer 220 may contain graphic objects displayed thereon, such as a temperature object 230, a humidity object 240, and a current time object 250. The graphics objects may be opaque, or may also be semitransparent.

The first layer 220 may be changed in transparency under the control of the control unit 110. Transparency may be expressed by means of numbers from 0 to 100. For example, transparency '0' indicates an opaque state in which the image 210 is completely invisible. Transparency '50' indicates a semitransparent state in which the image 210 is seen dimly. Transparency '10' indicates another semitransparent state in which the image 210 is nearly invisible. Transparency '100' indicates a transparent state in which the image 210 is completely visible. A semitransparent state may mean any state having transparency excluding '0' and '100'. Under the control of the control unit 110, transparency of the first layer 220 or at least part of the first layer (for instance, excluding any graphics objects) may be varied from 0 to 100.

The graphic objects 230, 240 and 250 may be displayed opaquely on the first layer 220. Even though transparency of the first layer 220 is changed, the graphic objects 230, 240 and 250 indicating temperature, humidity and current time may remain in an opaque state. The first layer 220 may have a region for allowing a change in transparency and the other region for disallowing a change in transparency. Regions of the graphic objects 230, 240 and 250 may disallow a change in transparency, and the other regions may allow a change in transparency.

Depending on transparency of the first layer 220, the image 210 may be displayed dimly or clearly on the touch screen. For example, when the first layer 220 is displayed, the initial transparency may be '70' indicating a semitransparent state. In this semitransparent state, the background image 210 may be displayed less dimly.

FIG. 2B shows another example of an image and an overlapped screen layer on the touch screen. Referring to FIGS. 1 and 2B, an image 292 is displayed on the touch screen 190. The image 292 may be a background image displayed in an idle state of the electronic device. Additionally, the first layer 290 may be displayed to be overlapped with the image 292. Since the first layer 290 is in a semitransparent state, the image 292 may be seen dimly through the first layer 290.

The first layer 290 may be changed in transparency by the control unit 110. Transparency may be expressed by means of numbers from 0 to 100. For example, transparency '0' indicates an opaque state in which the image 292 is completely invisible. Transparency '50' indicates a semitransparent state in which the image 292 is seen dimly. Transparency '10' indicates another semitransparent state in which the image 292 is nearly invisible. Transparency '100' indicates a transparent state in which the image 292 is completely visible. A semitransparent state may mean any state having transparency excluding '0' and '100'. Under the control of the control unit 110, transparency of the first layer 290 may be varied from 0 to 100.

Depending on transparency of the first layer 290, the image 292 may be displayed dimly or clearly on the touch screen. For example, when the first layer 290 is displayed, the initial transparency may be '70' indicating a semitransparent state. In this semitransparent state, the image 292 may be displayed less dimly.

Further, the second layer 280 may be displayed to be overlapped with the first layer 290. The second layer 280 may contain an opaque region for displaying information associated with conditions of the electronic device. For example, the second layer 280 may contain graphic objects displayed thereon, such as a temperature Object 288, a humidity object 286, a current time object 284, and a status bar 282.

The graphic objects 282, 284, 286 and 288 may be displayed opaquely on the second layer 280. The second layer 280 may have an opaque region for displaying information such as the graphic objects 282, 284, 286 and 288, and the other region that remains in a transparent state.

Figure 3:
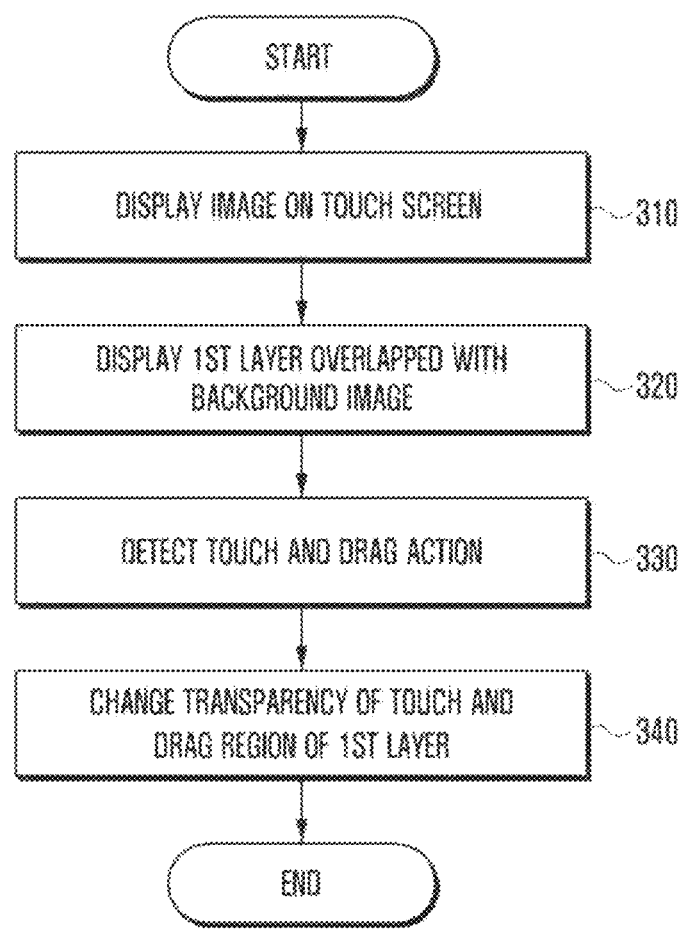
FIG. 3 is a flow diagram illustrating a process associated with a touch and drag action detected from a touch screen of an electronic device according to an embodiment of the present disclosure.
Figure 4A:
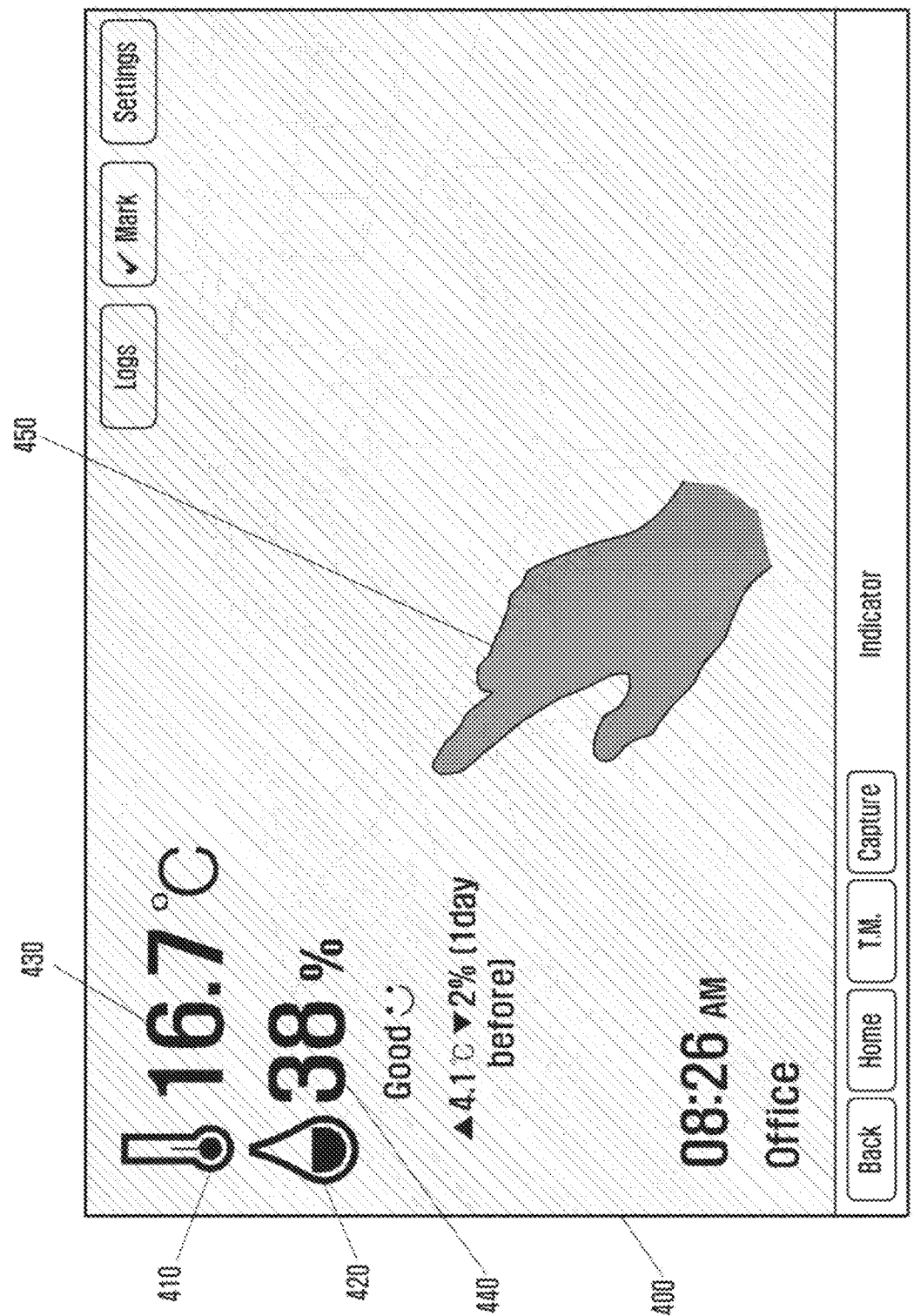
FIGS. 4A and 4B show screenshots illustrating graphic objects represented on a screen by a touch and drag action detected from a touch screen of an electronic device according to an embodiment of the present disclosure.
Figure 4B:

FIG. 3 is a flow diagram illustrating a process associated with a touch and drag action detected from a touch screen of an electronic device according to an embodiment of the present disclosure. FIGS. 4A and 4B show screenshots illustrating graphic objects represented on a screen by a touch and drag action detected from a touch screen of an electronic device according to an embodiment of the present disclosure.

Referring to FIGS. 1, 3, 4A and 4B, an image is displayed on the touch screen 190 at operation 310. The touch screen 190 may detect a user input, which may be a touch action to come in contact with the touch screen by using a separate input unit such as user's finger or a stylus pen, and/or a drag action to move such a finger or pen while keeping contact with the touch screen. When a user's finger is touched on the touch screen 190, the touch screen 190 may transmit coordinates of a touch point to the control unit 110.

At operation 320, the control unit 110 may control a display of the first layer 400 overlapped with the image. The first layer 400 is displayed opaquely, so that the image displayed on the touch screen 190 may be seen dimly.

The first layer 400 may contain various graphic objects displayed thereon, such as a temperature icon 410, a humidity icon 420, a temperature value 430, and a humidity value 440.

At operation 330, the control unit 110 may detect a touch and drag action from the touch screen 190. Specifically, the first layer 400 is displayed on the touch screen 190. When a user's finger 450 is touched on the touch screen 190, the touch screen 190 detects a touch action from a touch point thereon. Then the touch screen 190 may transmit coordinates of the touch point to the control unit 110. Additionally, the control unit 110 may detect a continuous movement of the touch action. This movement may be a drag action.

Referring to FIG. 4B, a user's finger 470 comes in contact with the first layer displayed on the touch screen 190 and moves to create a drag path 460. Drag path 460 could comprise a centre line of the user's finger movement and a predetermined area either side of the centre line. Alternatively, the drag path 60 could comprise the whole touch area of the user's finger at each point along the drag movement. In response to such a touch and drag action, at operation 340 the control unit 110 changes the transparency of a specific region of the first layer from which a touch and drag action is detected. For example, if the drag path 460 is created on the first layer by means of the user's finger 470, transparency of the drag path 460 is changed such that the drag path 460 becomes transparent. The control unit 110 may receive coordinates of the drag path 460 from the touch screen 190 and then change transparency of a specific region corresponding to the drag path 460 on the first layer.

For example, in the case where the initial transparency of the first layer is '70', transparency of the drag path 460 may be changed to '100'. Therefore, the drag path 460 becomes transparent, and the image underlying the drag path can be seen clearly.

Figure 5:
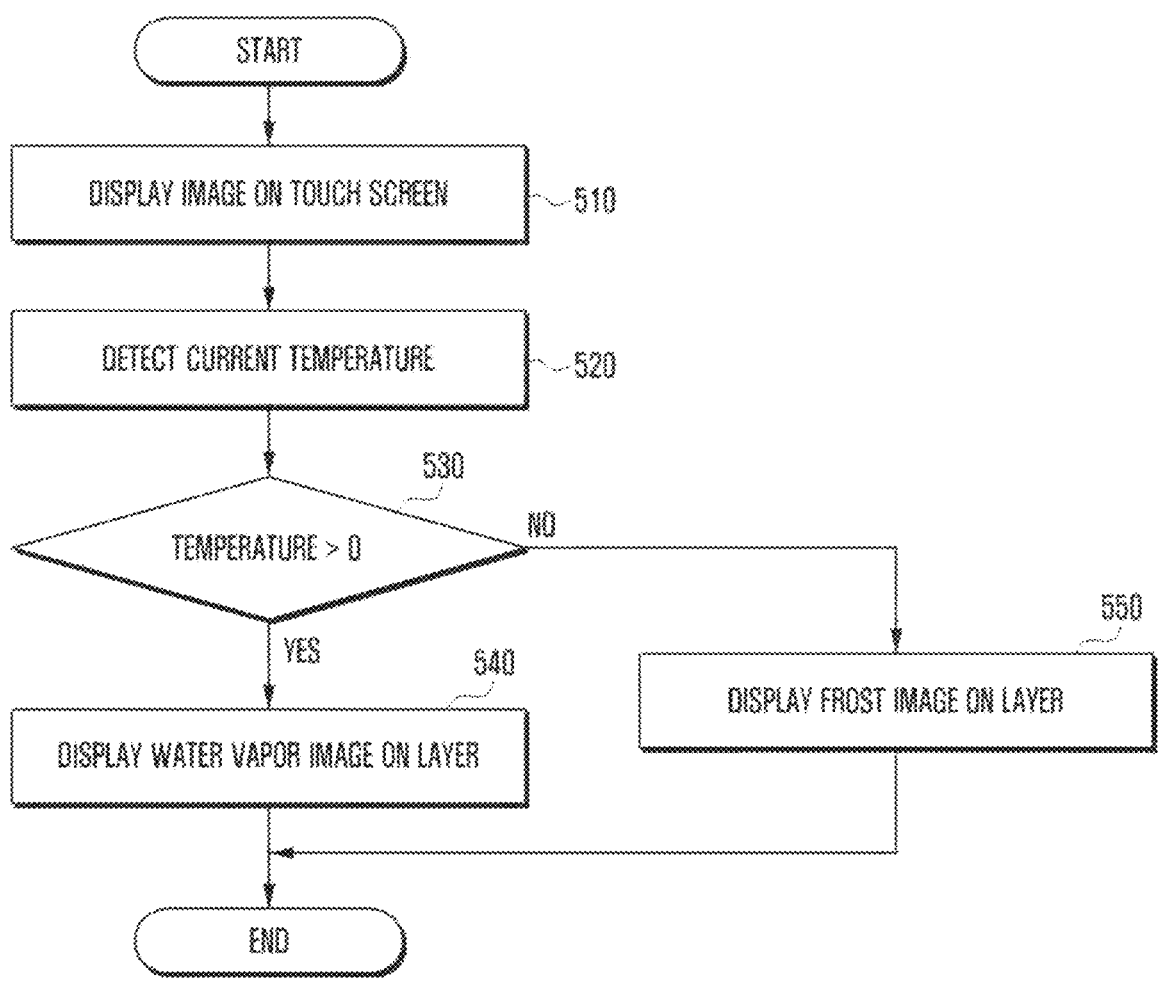
FIG. 5 is a flow diagram illustrating a process of displaying a layer with a varied attribute according to temperature on a touch screen of an electronic device according to an embodiment of the present disclosure.
Figure 6A:
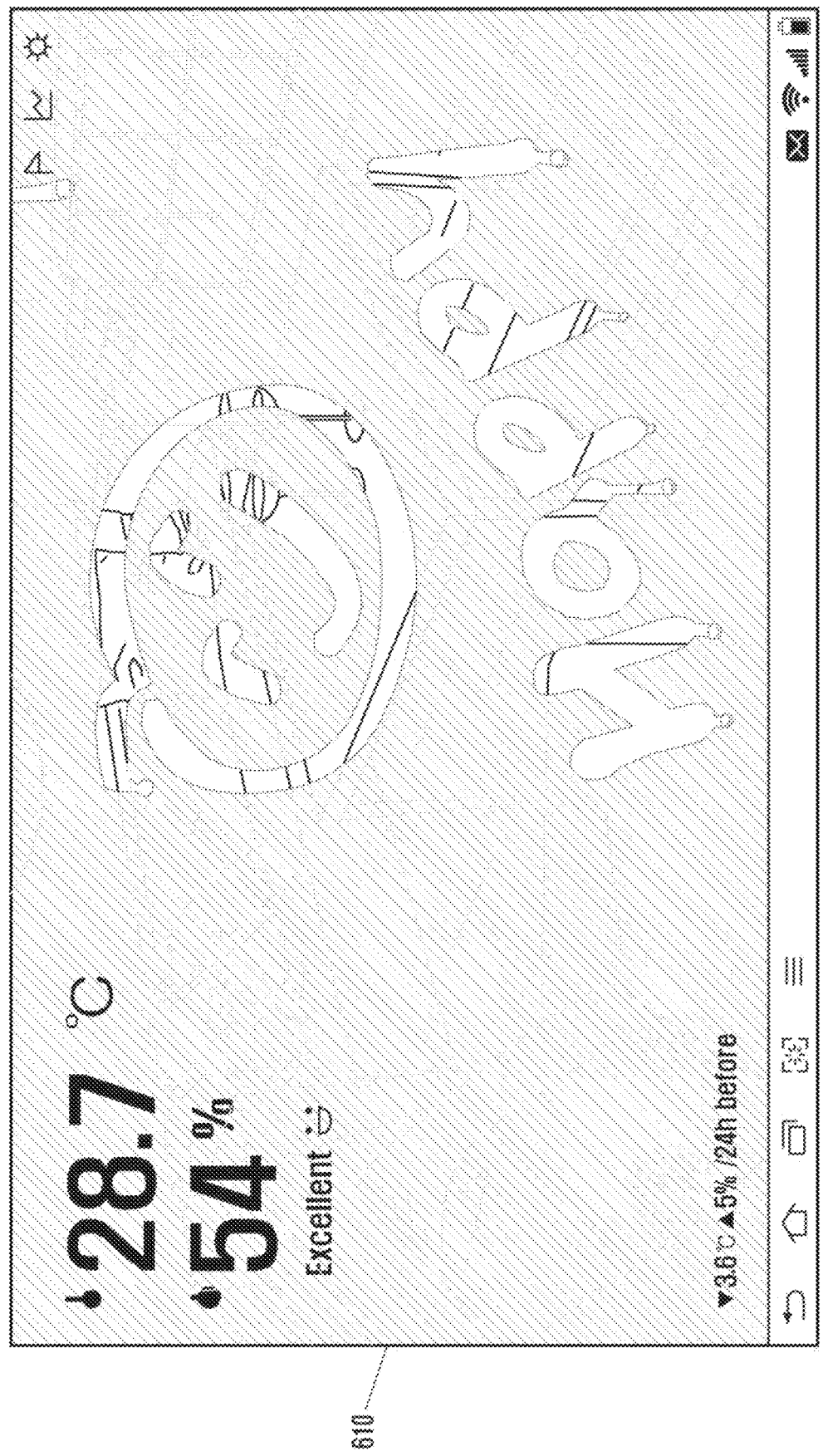
FIGS. 6A and 6B show screenshots illustrating layers displayed with different attributes according to temperature on a touch screen of an electronic device according to an embodiment of the present disclosure.
Figure 6B:
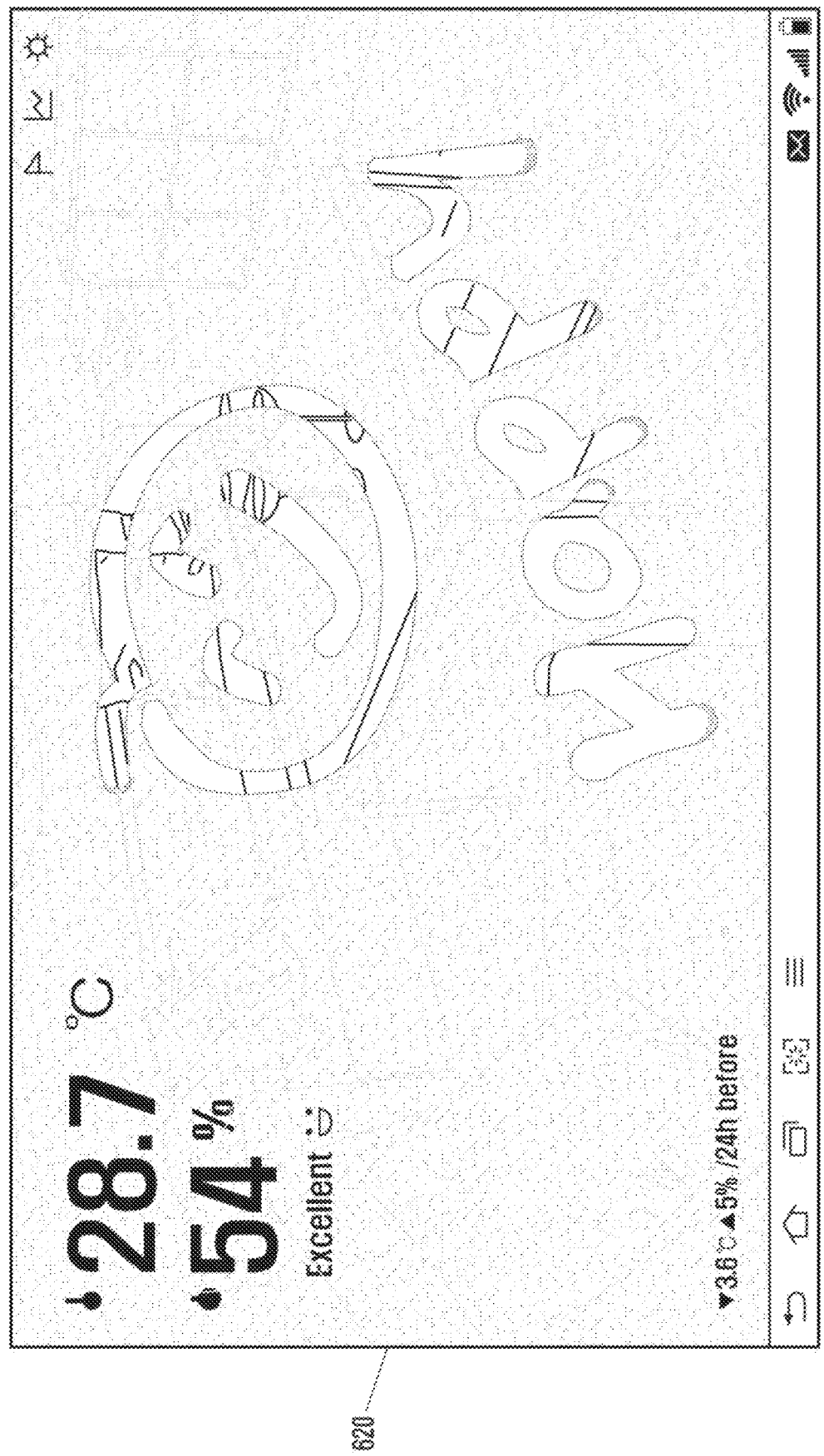

FIG. 5 is a flow diagram illustrating a process of displaying a layer with a varied attribute according to temperature on a touch screen of an electronic device according to an embodiment of the present disclosure. FIGS. 6A and 6B show screenshots illustrating layers displayed with different attributes according to temperature on a touch screen of an electronic device according to an embodiment of the present disclosure.

The first layer displayed on the touch screen may have at least two attributes, which may be determined depending on temperature. If a current temperature is higher than a predefined temperature, the control unit 110 may assign the first attribute to the first layer. In contrast, if a current temperature is equal to or lower than a predefined temperature, the control unit 110 may assign the second attribute to the first layer.

Referring to FIGS. 1, 5, 6A and 6B, the touch screen 190 displays an image at operation 510. The electronic device may include the temperature sensor 171. At operation 520, the temperature sensor 171 detects a current temperature. Then the temperature sensor 171 sends a detected temperature value to the control unit 110.

The control unit 110 may determine the attribute of the first layer, based on a temperature value received from the temperature sensor 171. If a current temperature is higher than a predefined temperature, the control unit 110 may display a water vapor image on the first layer. In contrast, if a current temperature is equal to or lower than a predefined temperature, the control unit 110 may display a frost image on the first layer.

For example, in case a predefined temperature is zero degree, the control unit 110 determines at operation 530 whether a current temperature is greater than zero degree. If a current temperature is greater than zero degree, the control unit 110 assigns an attribute 'water vapor' to the first layer. Therefore, at operation 540, a water vapor image or a similar pattern is displayed on the first layer. FIG. 6A shows the first layer 610 having an attribute 'water vapor' and covered with a water vapor image. If a current temperature is equal to or lower than zero degree, the control unit 110 assigns an attribute 'frost' to the first layer. Therefore, at operation 550, a frost image or a similar pattern is displayed on the first layer. FIG. 6B shows the first layer 620 having an attribute 'frost' and covered with a frost image. Although the first layer has two attributes (i.e., water vapor and frost) in this embodiment, any other type attributes or much more attributes may be alternatively used for the first layer.

The control unit 110 may determine a current temperature based on data received from any external entity. For example, accessing the Internet through the mobile communication unit 120 or the sub-communication unit 130, the control unit 110 may determine a current temperature at the outside of the electronic device 100 or at a specific area.

Figure 7:
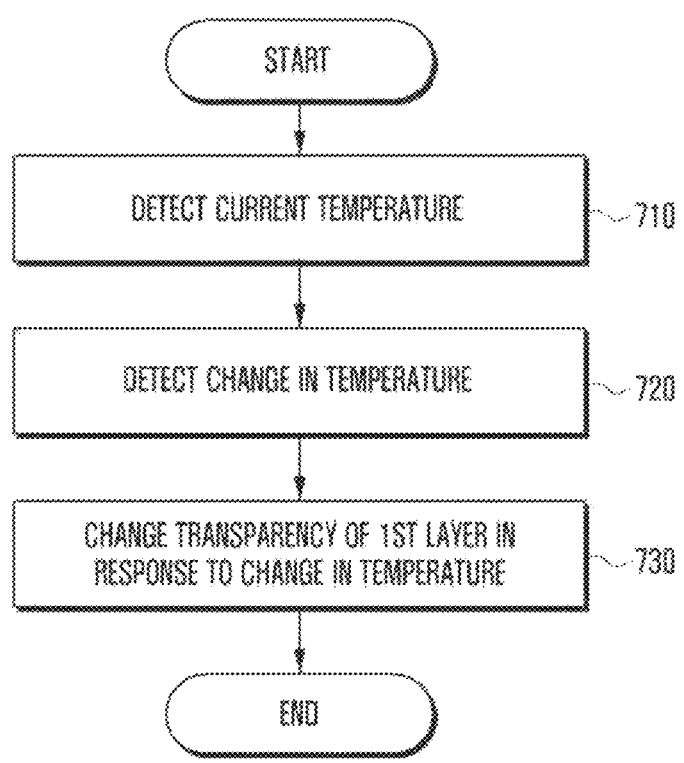
FIG. 7 is a flow diagram illustrating a process associated with temperature changes in an electronic device according to an embodiment of the present disclosure.
Figure 8A:
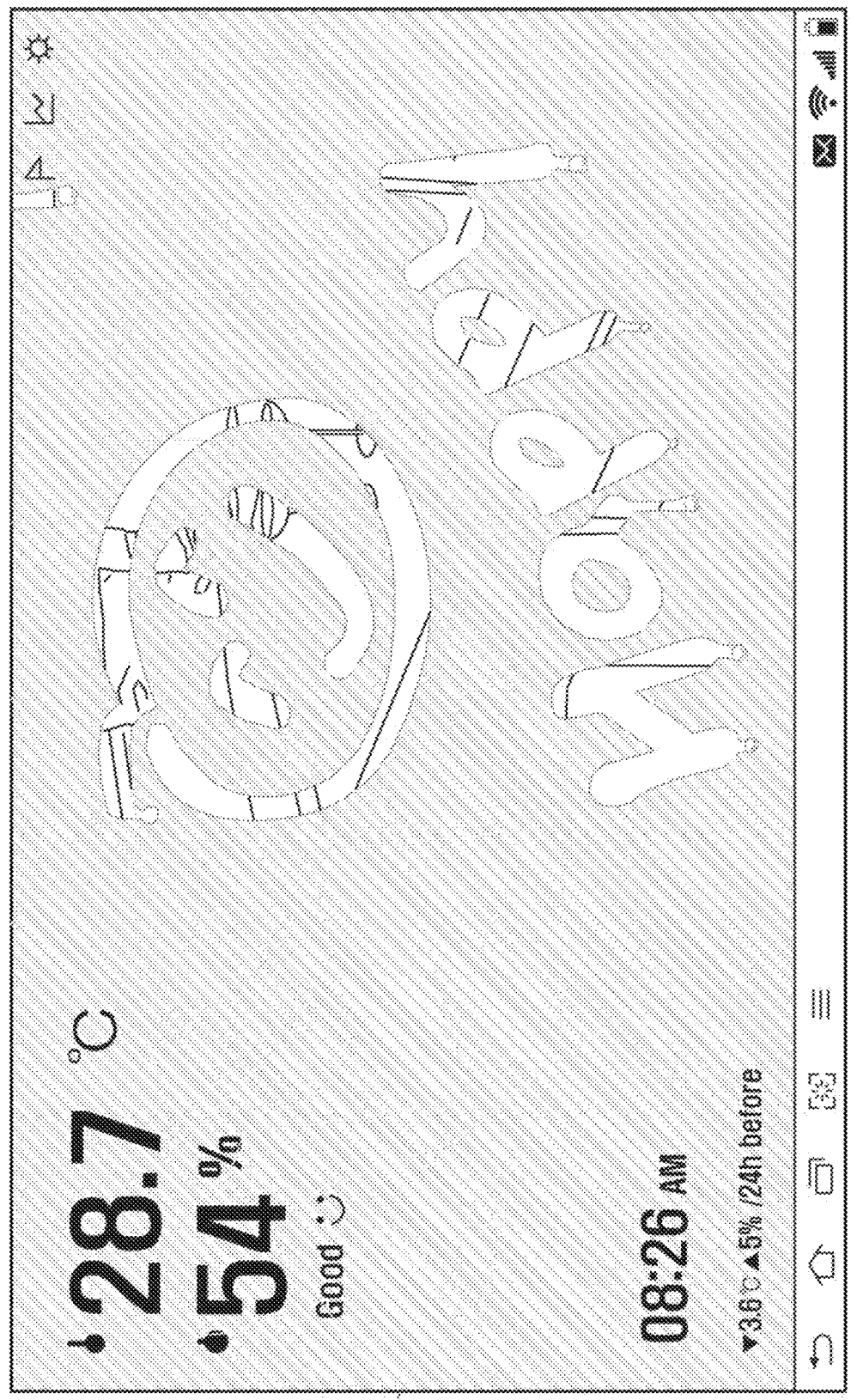
FIGS. 8A and 8B show screenshots illustrating variations of transparency according to temperature changes on a touch screen of an electronic device according to an embodiment of the present disclosure.
Figure 8B:
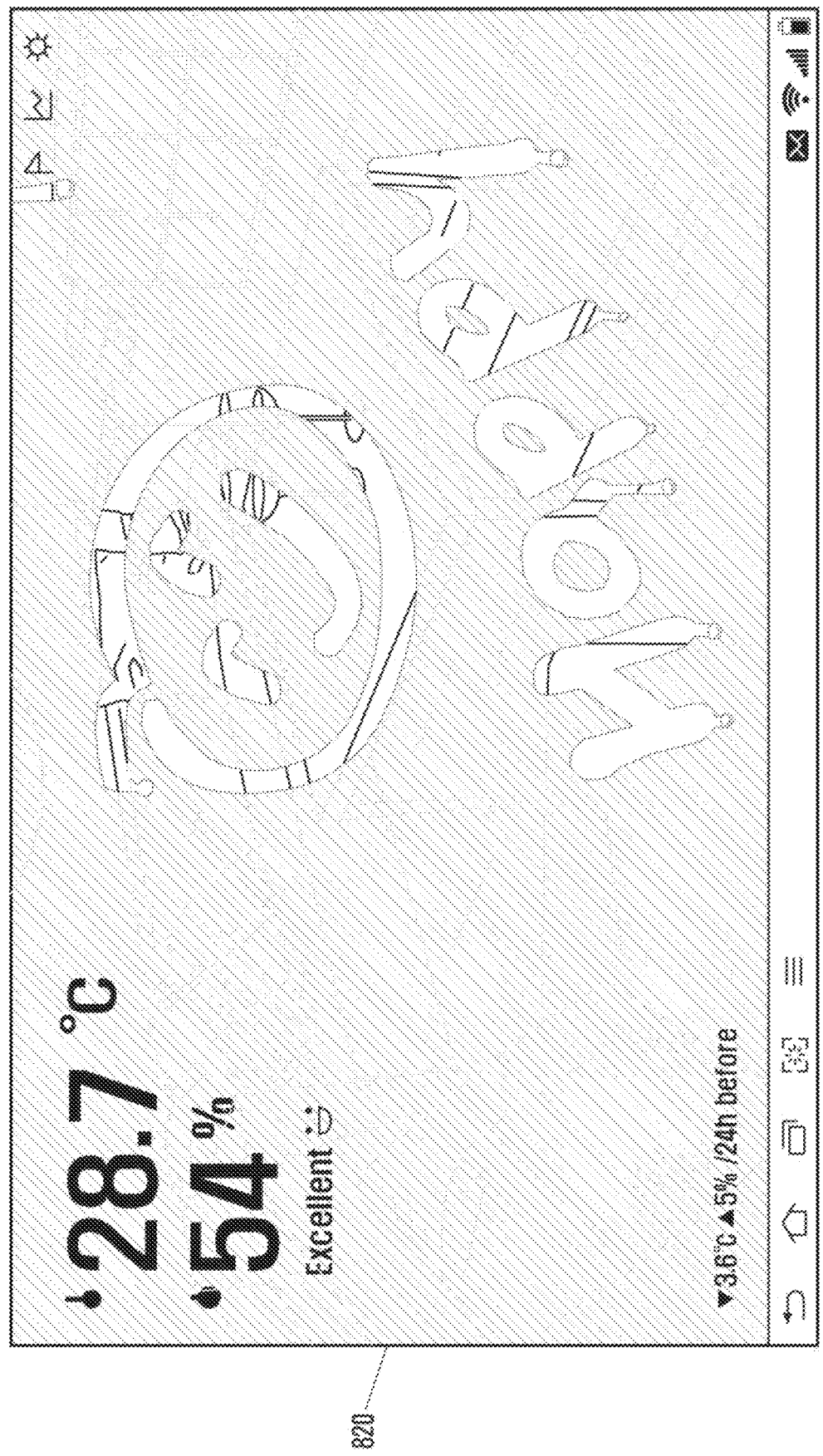

FIG. 7 is a flow diagram illustrating a process associated with temperature changes in an electronic device according to an embodiment of the present disclosure. FIGS. 8A and 8B show screenshots illustrating variations of transparency according to temperature changes on a touch screen of an electronic device according to an embodiment of the present disclosure.

Referring to FIGS. 1, 7, 8A and 8B, the temperature sensor 171 detects a current temperature at operation 710. Then, at operation 720, the control unit 110 receives temperature data from the temperature sensor 171 and determines whether there is a change in temperature. Alternatively, the control unit 110 may determine a current temperature or temperature changes based on data received from any external entity. At operation 730, in response to a change in temperature, the control unit 110 changes transparency of the first layer displayed in a semitransparent state. For example, as shown in FIG. 8A, the first layer 810 initially has a transparency of '60'. If a change in temperature is detected, the control unit 110 changes transparency of the first layer. Specifically, transparency is increased according to an ascending temperature and decreased according to a descending temperature, and vice versa. FIG. 8B shows that transparency of the first layer 820 is changed to '70'. Due to an increase in transparency, the background image underlying the first layer can be more clearly seen, The control unit 110 may change transparency of all regions of the first layer according to weather information which includes at least one of temperature, humidity, and wind direction. Accessing an external weather server through the mobile communication unit 120 or the subcommunication unit 130, the control unit 110 may receive weather information or data from the weather server.

Figure 9:
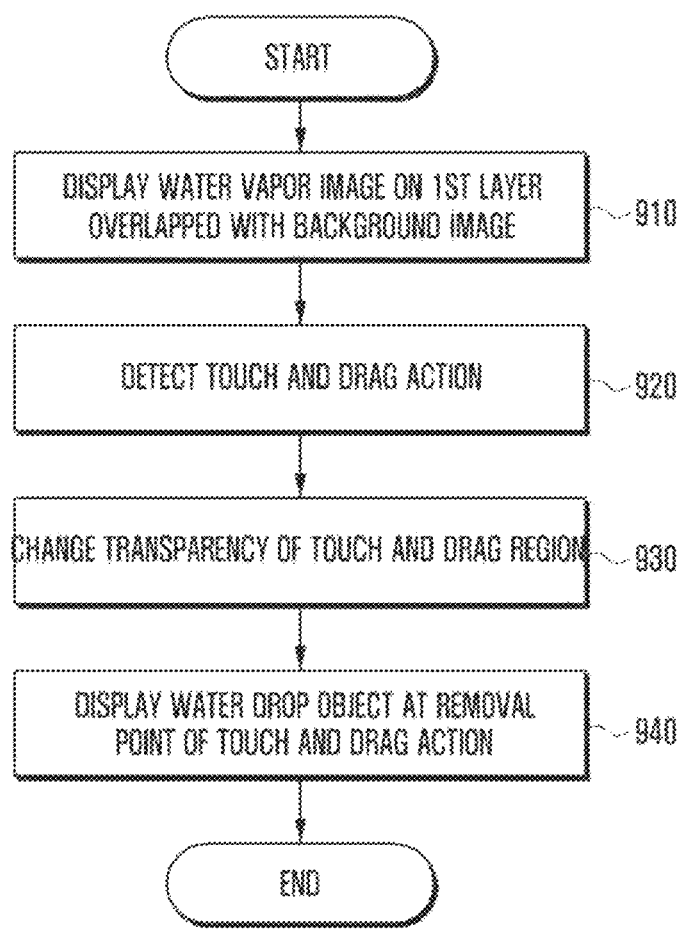
FIG. 9 is a flow diagram illustrating a process associated with the removal of a touch and drag action from a touch screen in an electronic device according to an embodiment of the present disclosure.
Figure 10:
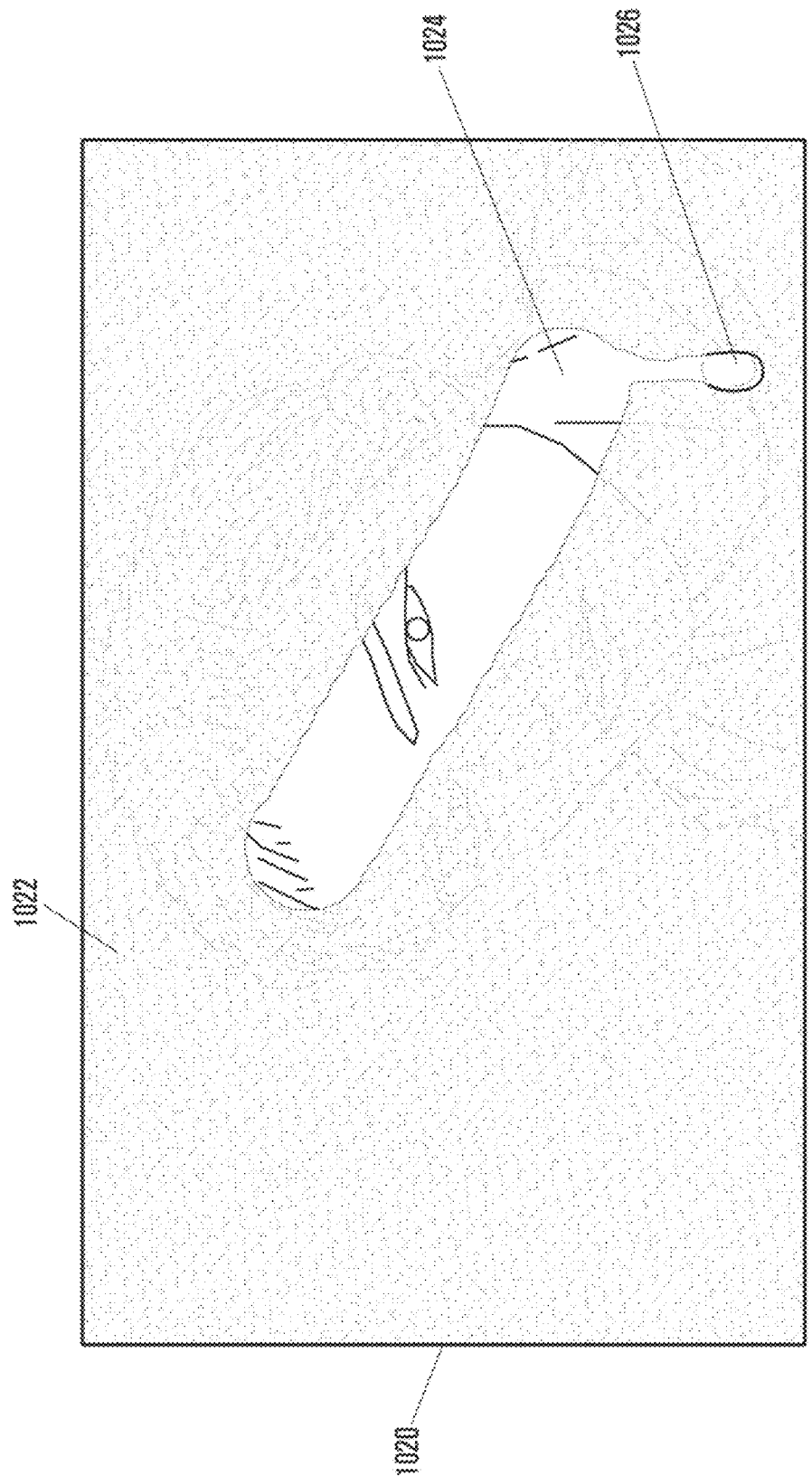
FIG. 10 shows a screenshot illustrating a water drop object displayed at a removal point of a touch and drag action on the first layer of a touch screen of an electronic device according to an embodiment of the present disclosure.

FIG. 9 is a flow diagram illustrating a process associated with the removal of a touch and drag action from a touch screen in an electronic device according to an embodiment of the present disclosure. FIG. 10 shows a screenshot illustrating a water drop object displayed at a removal point of a touch and drag action on the first layer of a touch screen of an electronic device according to an embodiment of the present disclosure.

Referring to FIGS. 1, 9 and 10, the first layer is displayed in a semitransparent state, being overlapped with the background image displayed on the touch screen 190. At operation 910, a water vapor image is displayed on the first layer. Namely, the first layer 1020 has an attribute of water vapor, so that the water vapor image 1022 can be displayed on the first layer 1020. When a user takes a touch and drag action along a certain region of the first layer 1020 displayed on the touch screen 190, the touch screen 190 detects the touch and drag action at operation 920 and then sends coordinates of the detected region to the control unit 110.

At operation 930, the control unit 110 changes the transparency of the detected region of the first layer such that a background image 1024 can be seen. After the touch and drag action is removed, the control unit 110 may control a water drop object 1026 to be displayed at a removal point of the touch and drag action at operation 940. The water drop object 1026 is a sort of graphic object having the form of a water drop. The water drop object 1026 may be displayed at a specific location of the first layer under the control unit 110. Also, the water drop object 1026 may be moved in the direction of gravity under the control of the control unit 110. In other embodiments, water drop objects may be displayed at one or more or each local lowest point along the drag path, with lowest point being defined according to the direction of gravity and local lowest point referring to a portion of the drag path which is lowest compared to immediately adjacent areas.

Namely, at operation 930, the transparency of a touch and drag region is changed, and therefore the background image 1024 is seen clearly. Further, at operation 940, the water drop object 1026 is displayed at the end point of the touch and drag region.

Figure 11:
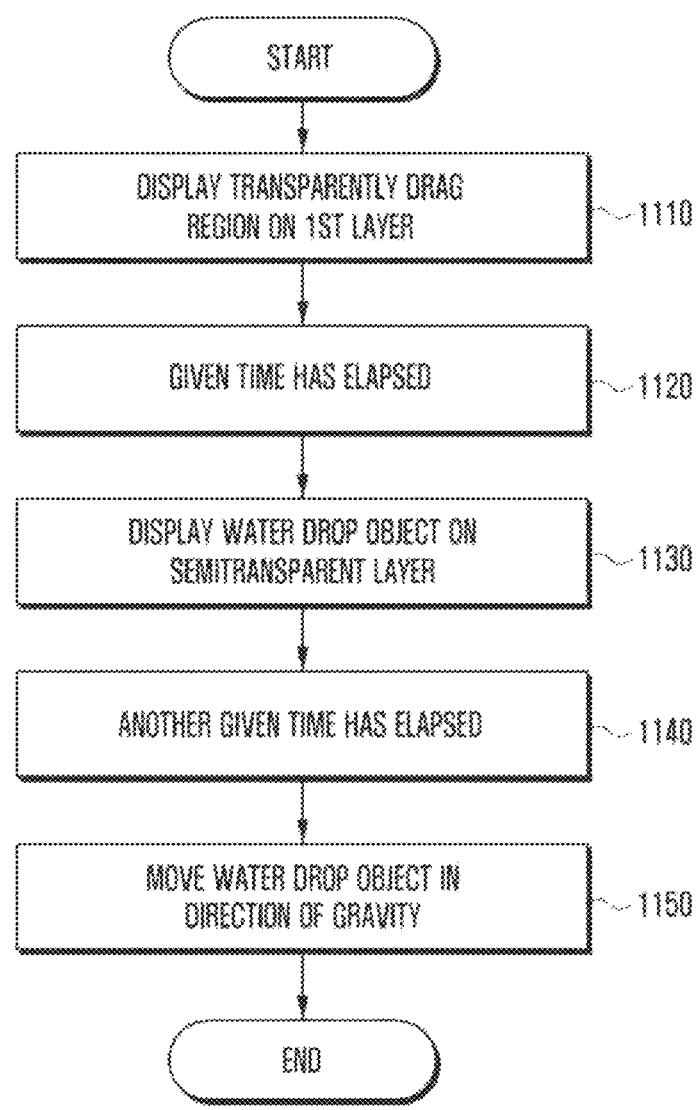
FIG. 11 is a flow diagram illustrating a process after an elapse of a given time from a display of a water drop object on a touch screen in an electronic device according to an embodiment of the present disclosure.
Figure 12A:
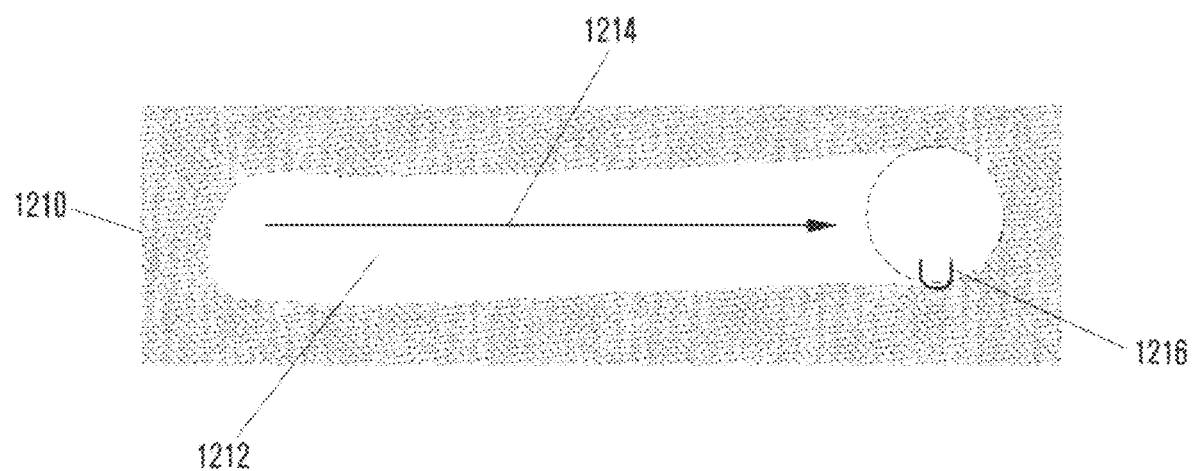

FIG. 11 is a flow diagram illustrating a process after an elapse of a given time from a display of a water drop object on a touch screen in an electronic device according to an embodiment of the present disclosure. FIGS. 12A and 12B show screenshots illustrating the movement of a water drop object after an elapse of a given time from a display of the water drop object on a touch screen of an electronic device according to an embodiment of the present disclosure.

Referring to FIGS. 1, 11, 12A and 12B, the first layer 1240 having an attribute of a water vapor image 1242 is displayed in a semitransparent state on the touch screen 190, being overlapped with the background image. When a user's finger (not shown) is touched on and dragged along a part of the first layer 1240, a touch and drag region 1244 of the first layer 1240 is displayed transparently at operation 1110.

When a given time has elapsed at operation 1120 after a transparent display, a water drop object is displayed on the first layer at operation 1130. Namely, after an elapse of a predetermined time, the control unit 110 may control the first layer 1240 to display the water drop object.

The water drop object may be displayed near a specific region from which a touch and drag action is detected. Alternatively, the water drop object may be displayed at a random position near the edge of the first layer. When another given time has elapsed at operation 1140 after a display of the water drop object on the first layer, the water drop object may be moved in the direction of gravity at operation 1150.

For example, as shown in FIG. 12A, a user's finger is touched on the touch screen 190 and dragged in a specific direction 1214. Then the control unit 110 receives coordinates of a touch and drag region 1212 from the touch screen 190, and controls the touch and drag region 1212 to be displayed transparently. Namely, a specific region 1212 of the first layer 1210, corresponding to a finger drag path, is displayed in a transparent state on the touch screen 190. When a given time has elapsed after the touch and drag region 1212 is displayed transparently, a water drop object 1216 is displayed at the end point of the touch and drag region 1212 on the first layer 1210. Alternatively, as soon as a touch and drag action is removed, the water drop object 1216 may be displayed on the first layer 1210. As noted above, the water drop object may also or alternatively be positioned at localised lowest points along the drag path.

When another given time has elapsed after the water drop object 1216 is displayed on the first layer 1210, the control unit 110 may control the water drop object 1216 to be moved in the direction of gravity. Namely, the water drop object 1216 created at a drag removal point as shown in FIG. 12A begins to move in the direction of gravity after an elapse of a given time as indicated by a reference number 1246 in FIG. 12B. The control unit 110 may determine the direction of gravity by receiving signals from the gyro sensor (not shown) and/or the acceleration sensor (not shown).

Figure 13:
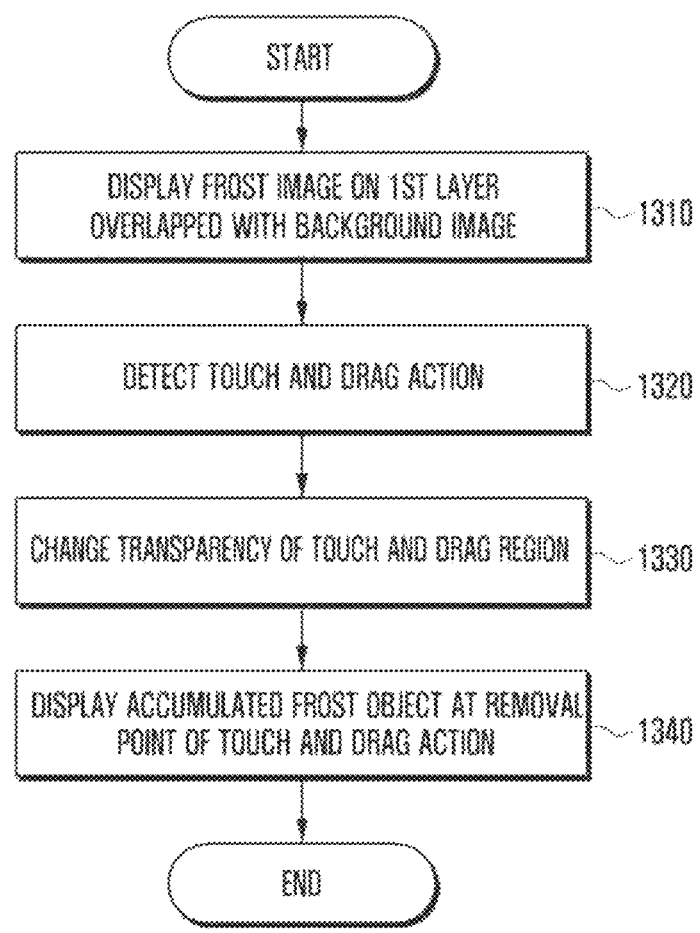
FIG. 13 is a flow diagram illustrating a process associated with a touch and drag action detected from a layer with a frost image on a touch screen of an electronic according to an embodiment of the present disclosure.
Figure 14A:
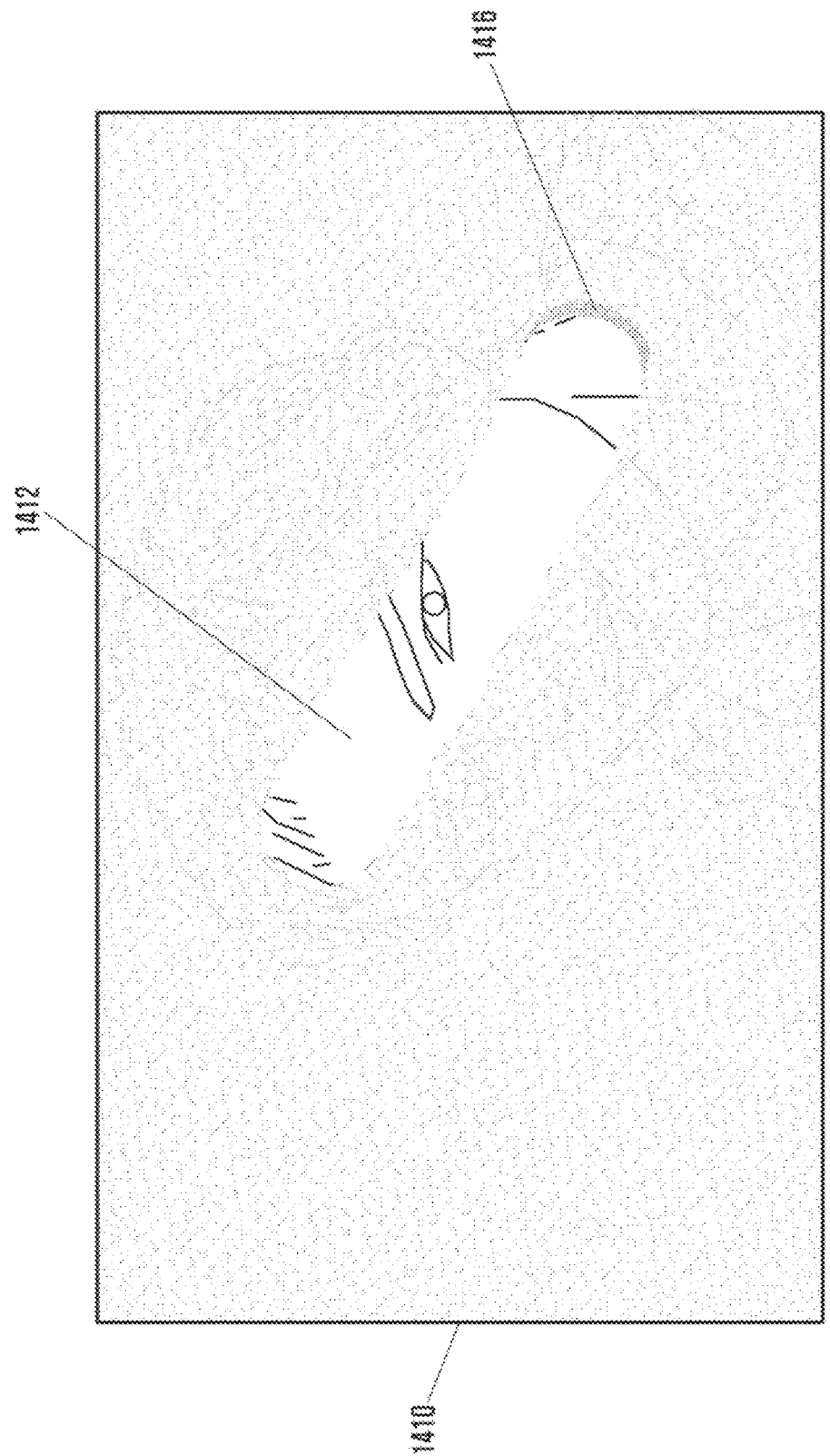
FIGS. 14A, 14B, and 14C show screenshots illustrating an accumulated frost object displayed in response to the removal of a touch and drag action detected from a layer with a frost image on a touch screen of an electronic device according to an embodiment of the present disclosure.
Figure 14B:
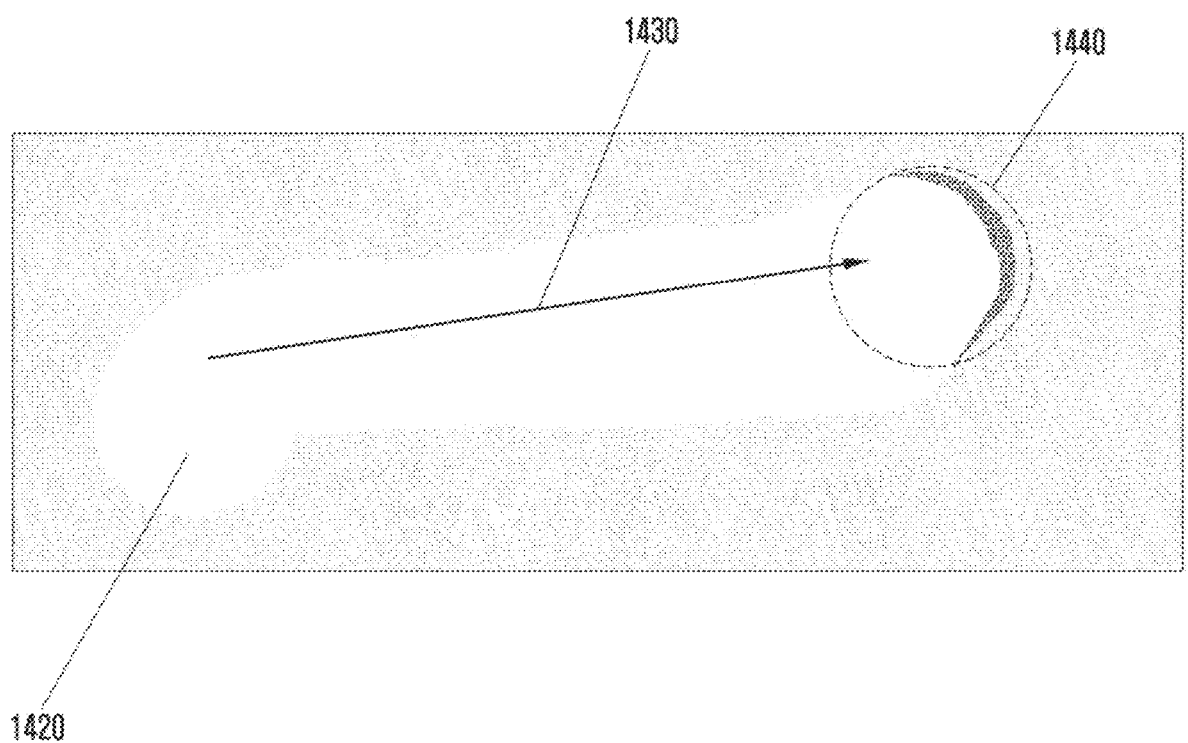
Figure 14C:
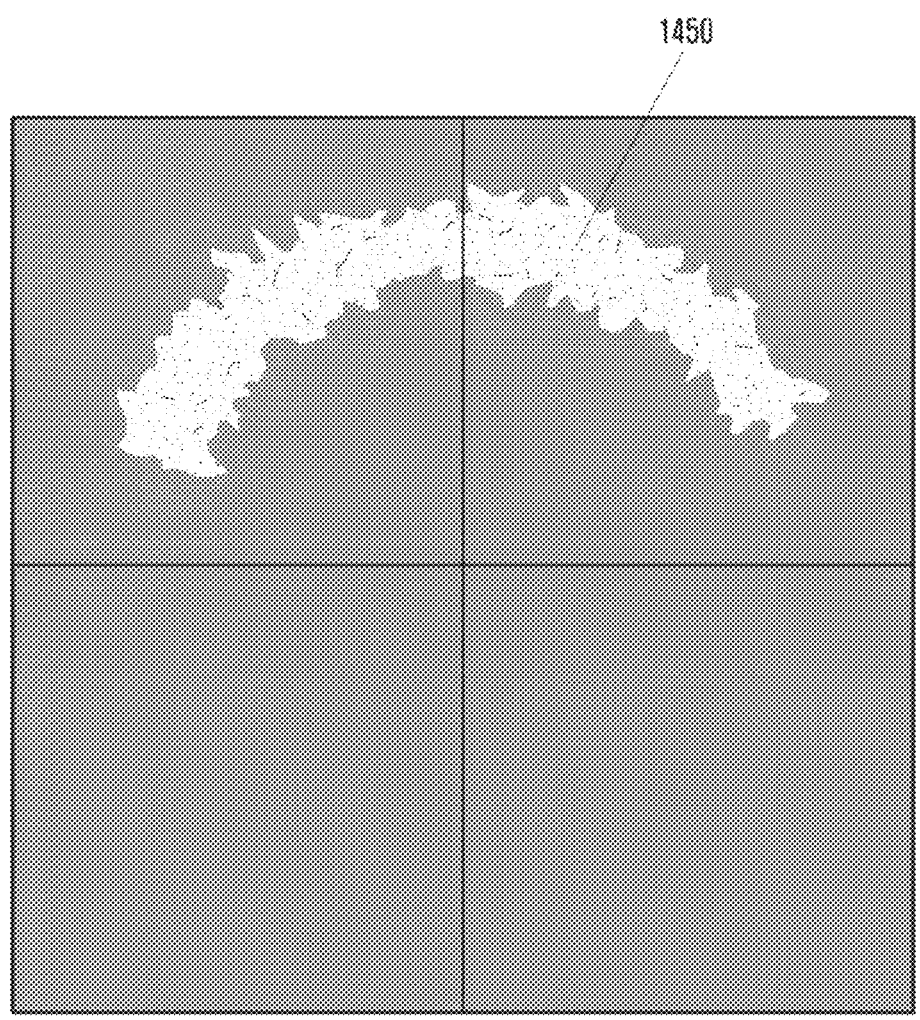

FIG. 13 is a flow diagram illustrating a process associated with a touch and drag action detected from a layer with a frost image on a touch screen of an electronic device according to an embodiment of the present disclosure. FIGS. 14A to 14C show screenshots illustrating an accumulated frost object displayed in response to the removal of a touch and drag action detected from a layer with a frost image on a touch screen of an electronic device according to an embodiment of the present disclosure.

In case a frost image is displayed on the first layer, the control unit 110 may create an accumulated frost object at a drag removal point.

Referring to FIGS. 1, 13 and 14A, the first layer 1410 is displayed in a semitransparent state, being overlapped with the background image displayed on the touch screen 190. At operation 1310, a frost image is displayed on the first layer 1410. Namely, the first layer 1410 has an attribute of frost, so that the frost image can be displayed on the first layer 1410. When a user takes a touch and drag action along a certain region of the first layer 1410 displayed on the touch screen 190, the touch screen 190 detects the touch and drag action at operation 1320 and then sends coordinates of the detected region to the control unit 110. At operation 1330, the control unit 110 changes the transparency of the detected region of the first layer such that a background image 1412 can be seen clearly. After the touch and drag action is removed, the control unit 110 may control an accumulated frost object 1416 to be displayed at a removal point of the touch and drag action at operation 1340.

For example, as shown in FIG. 14B, a user's finger is touched on the touch screen 190 and dragged in a specific direction 1430. Then the control unit 110 receives coordinates of a touch and drag region 1420 from the touch screen 190, and controls the touch and drag region 1420 to be displayed transparently. In the case where the initial transparency of the first layer is '70', transparency of the touch and drag region 1420 is changed to '0' indicating a transparent state. Therefore, the touch and drag region 1420 is displayed transparently. Further, at the end point 1440 of the touch and drag region 1420, an accumulated frost object 1450 is displayed. As enlargedly shown in FIG. 14C, the accumulated frost object 1450 may be displayed in the form of crescent brows at a drag removal point.

Figure 15:
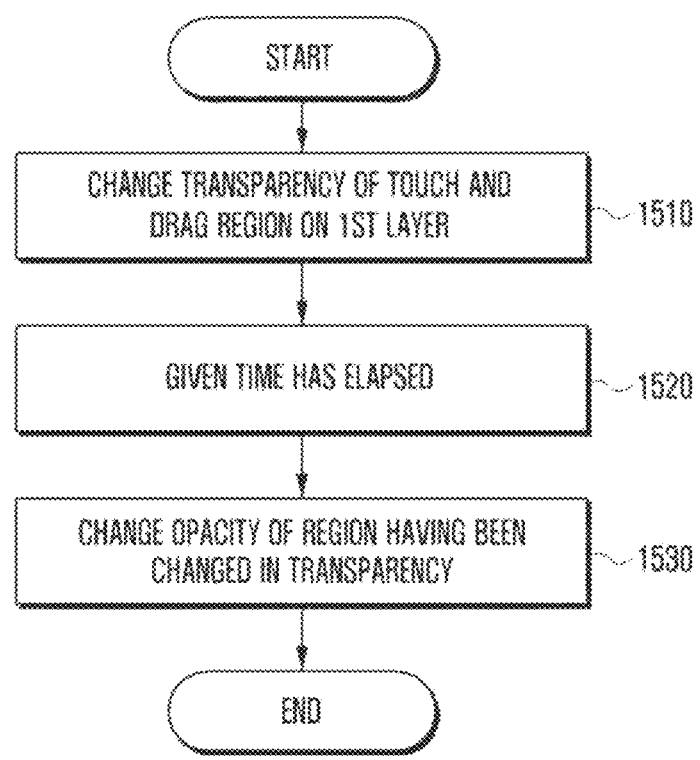
FIG. 15 is a flow diagram illustrating a process after an elapse of a given time from a display of a region having been changed in transparency on a touch screen in an electronic device according to an embodiment of the present disclosure.
Figure 16A:
FIGS. 16A, 16B, and 16C show screenshots illustrating the disappearance of a region having been changed in transparency after an elapse of a given time from a display of the region on a touch screen of an electronic device according to an embodiment of the present disclosure.
Figure 16B:
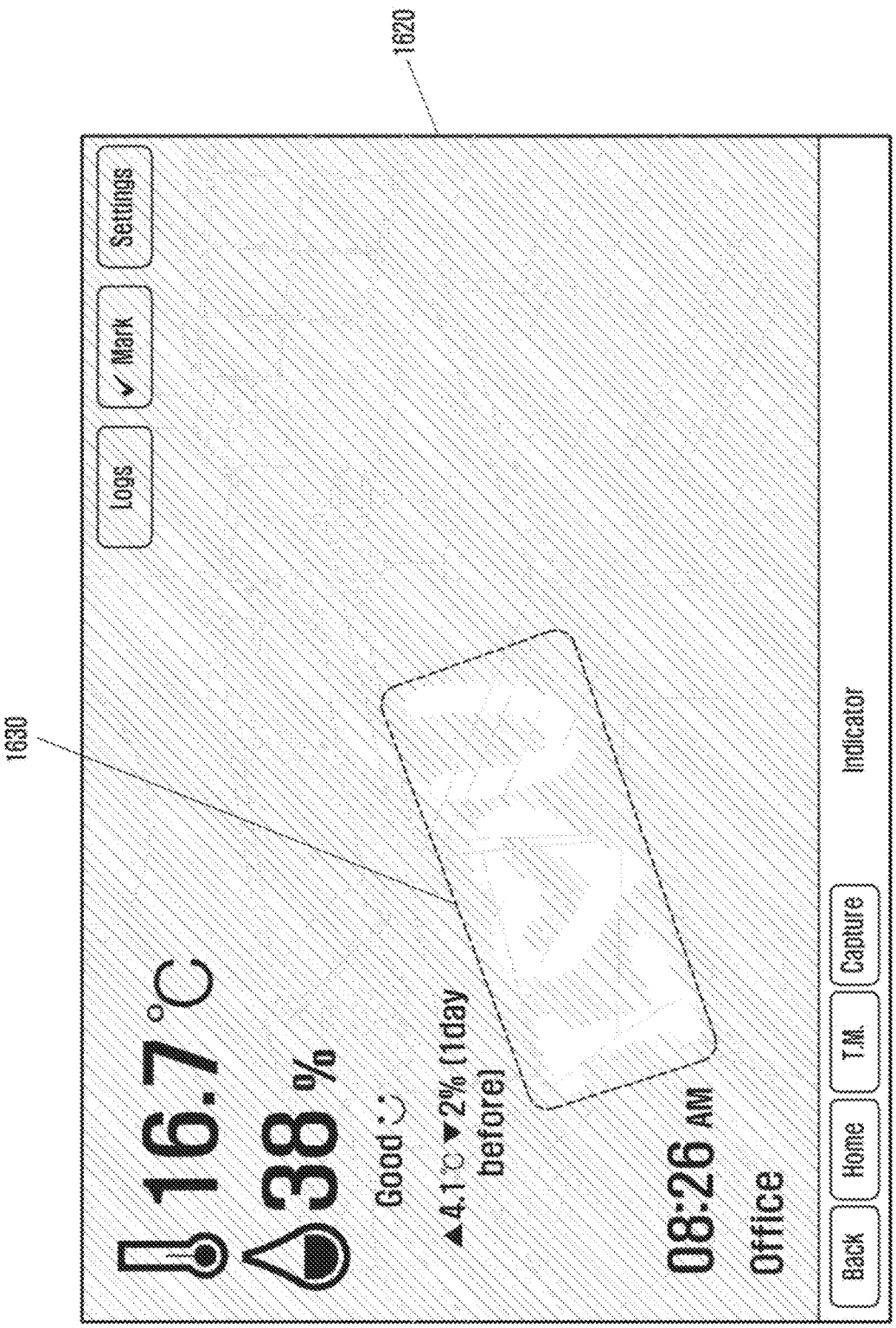
Figure 16C:
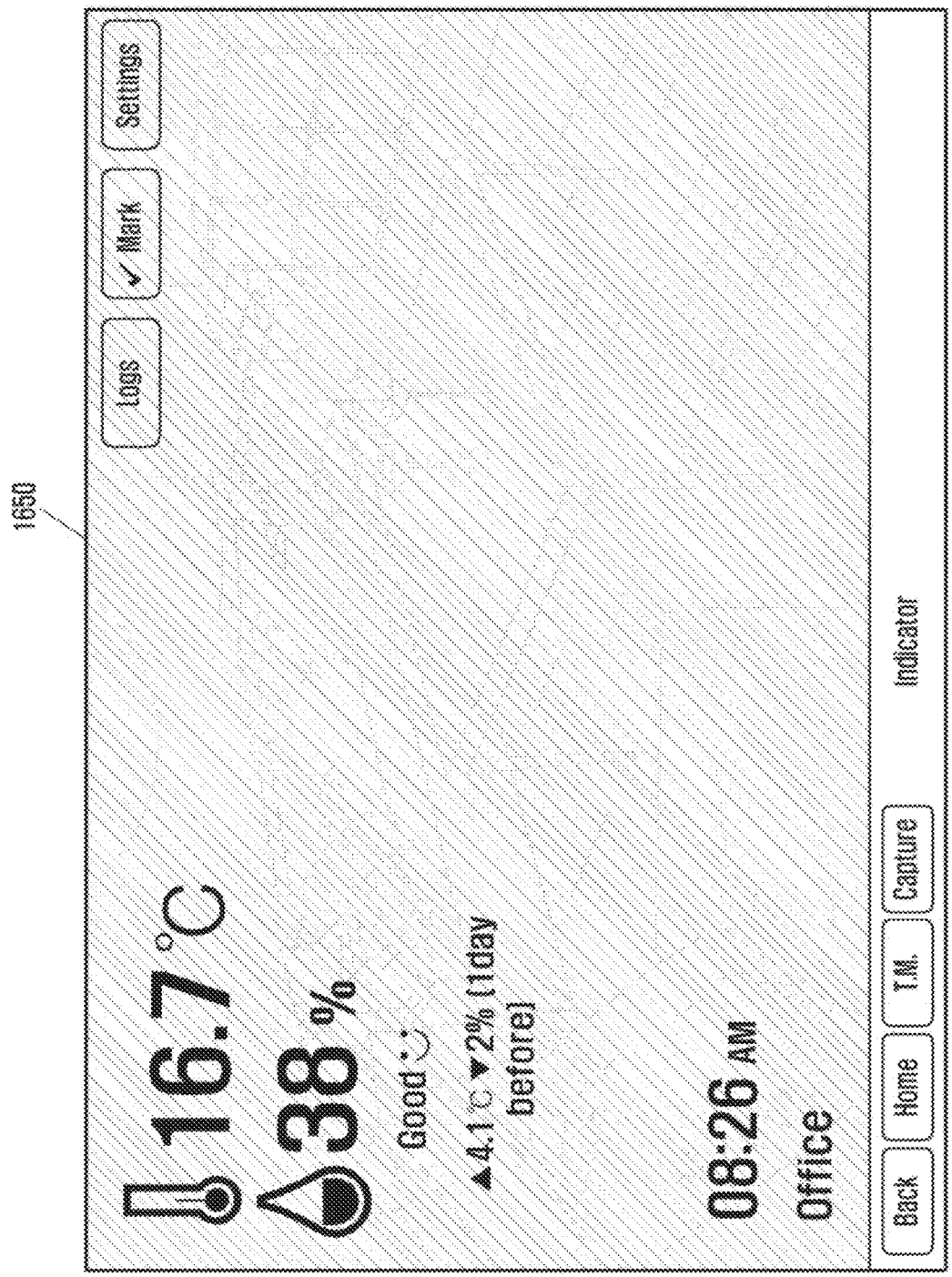

FIG. 15 is a flow diagram illustrating a process after an elapse of a given time from a display of a region having been changed in transparency on a touch screen in an electronic device according to an embodiment of the present disclosure. FIGS. 16A to 16C show screenshots illustrating the disappearance of a region having been changed in transparency after an elapse of a given time from a display of the region on a touch screen of an electronic device according to an embodiment of the present disclosure.

The control unit 110 may control a specific region (e.g., where a user input occurs) to be changed in transparency as time passes. A user input may be a touch and drag action detected from the touch screen.

Referring to FIGS. 1, 15, and 16A to 16C, the first layer 1600 is displayed in a semitransparent state, being overlapped with the background image displayed on the touch screen 190. When a user takes a touch and drag action along a certain region of the first layer 1600 displayed on the touch screen 190, the touch screen 190 detects the touch and drag action and then sends coordinates of the detected region to the control unit 110. At operation 1510, the control unit 110 changes the transparency of the detected region of the first layer. Then the control unit 110 determines whether a given time has elapsed after a transparent display of the detected region. When a given time has elapsed at operation 1520, the control unit 110 changes the opacity of the region having been changed in transparency at operation 1530. A change to an opaque state is accomplished by a gradual decrease of transparency. Namely, the control unit 110 gradually decreases transparency to the initial transparency of the first layer. For example, the first layer is displayed at the initial transparency of '70' on the touch screen. When a touch and drag action is received to a specific region of the first layer, transparency of the specific region is changed from '70' to '100'. Then, after twenty seconds, the control unit 110 begins to gradually decrease transparency of the specific region from '100' to '70'.

FIG. 16A shows that a touch and drag region 1610 is displayed transparently on the first layer 1600 having a semitransparent state. A dotted line is virtually used to indicate the touch and drag region 1610 which actually occurs. FIG. 16B shows that the touch and drag region 1630 is changed to a slightly semitransparent state as time passes. At this time, transparency of the touch and drag region 1630 is still different from that of the first layer 1620. FIG. 16C shows that the touch and drag region is completely invisible on the first layer 1650 as time further passes.

FIGS. 17A to 17D show screenshots illustrating a sequential disappearance of a region having a change in transparency after an elapse of a given time from a display of the region on a touch screen of an electronic device according to an embodiment of the present disclosure.

Figure 17A:
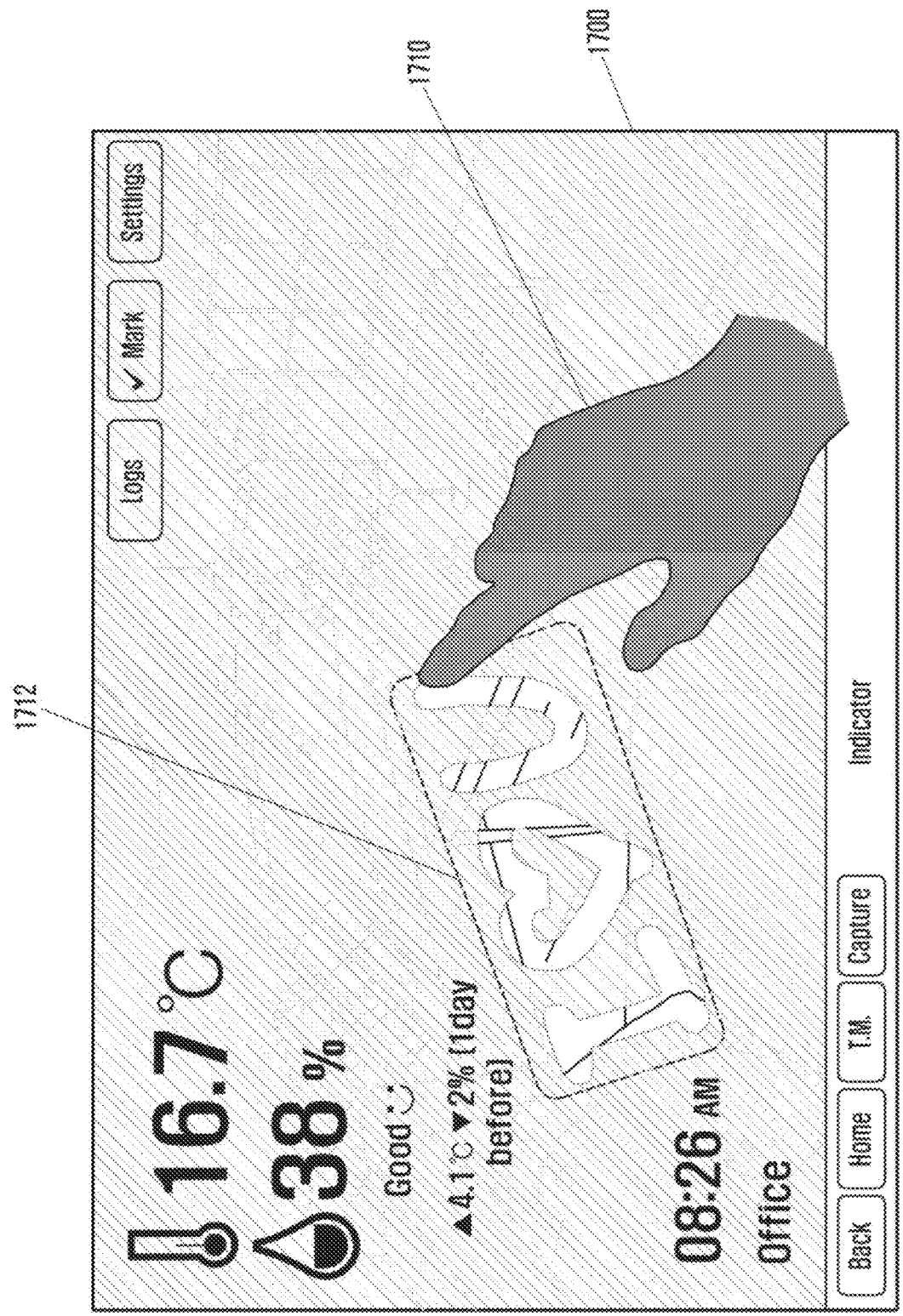
FIGS. 17A, 17B, 17C, and 17D show screenshots illustrating a sequential disappearance of a region having been changed in transparency after an elapse of a given time from a display of the region on a touch screen of an electronic device according to an embodiment of the present disclosure.
Figure 17B:
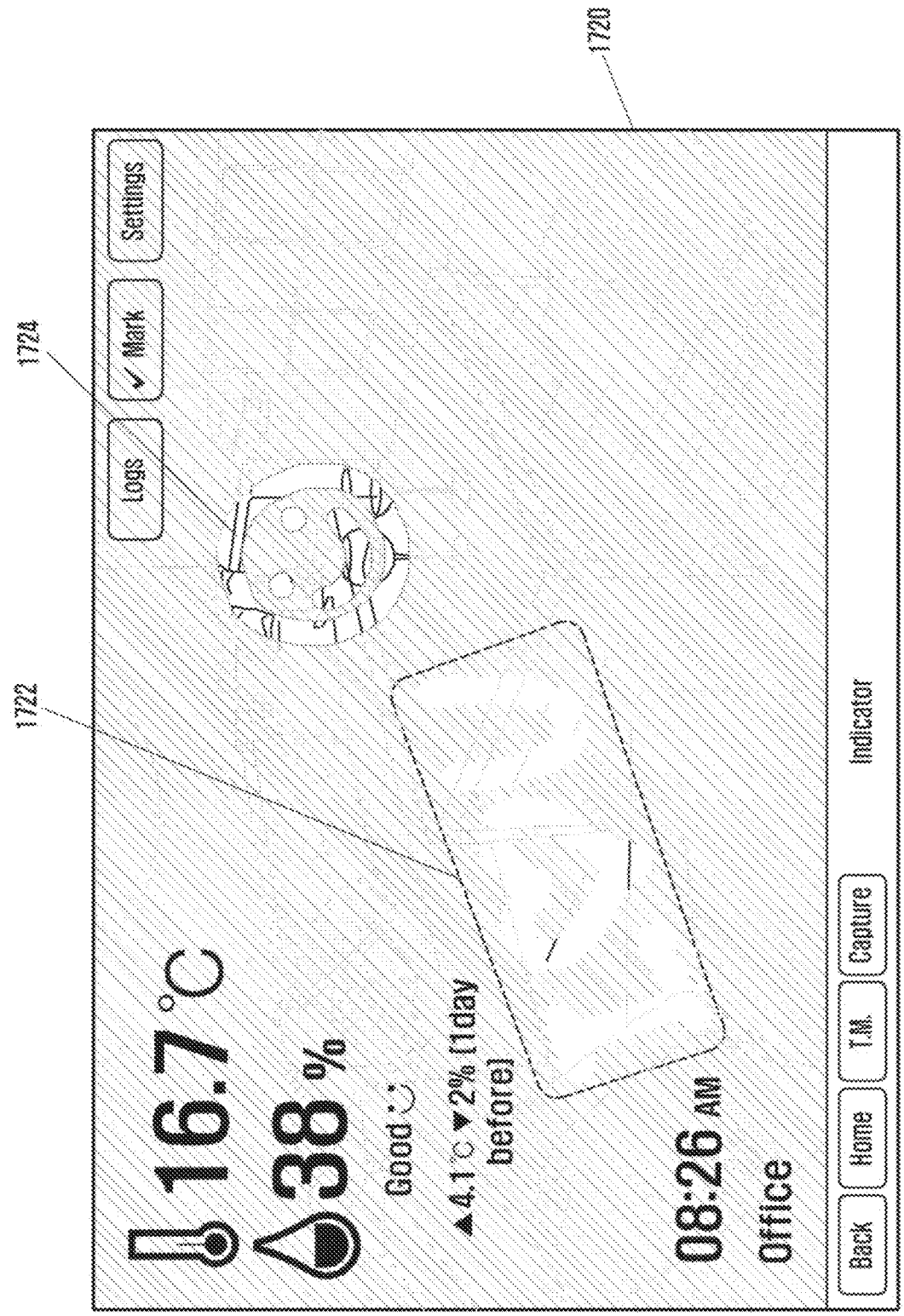
Figure 17C:
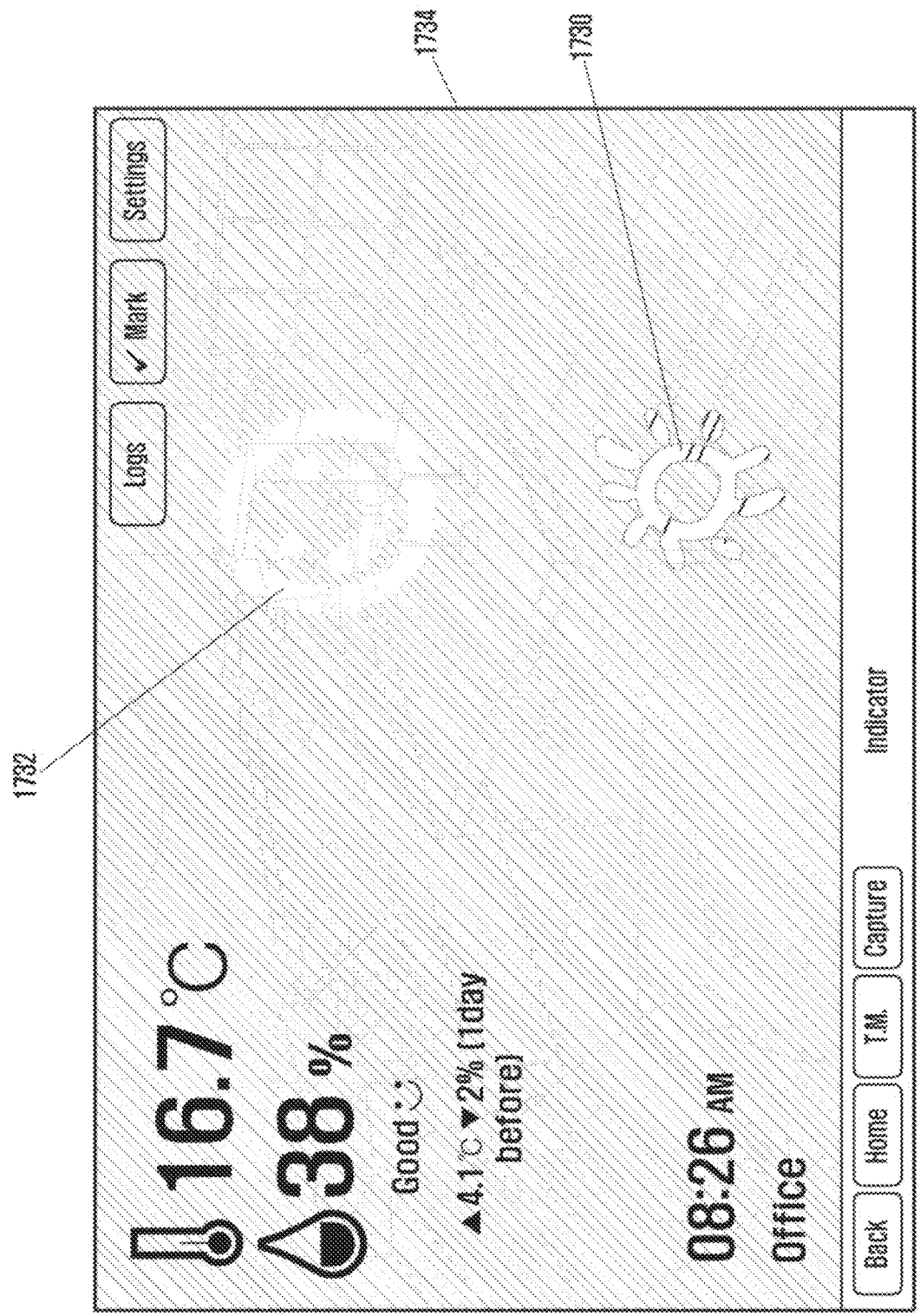
Figure 17D:
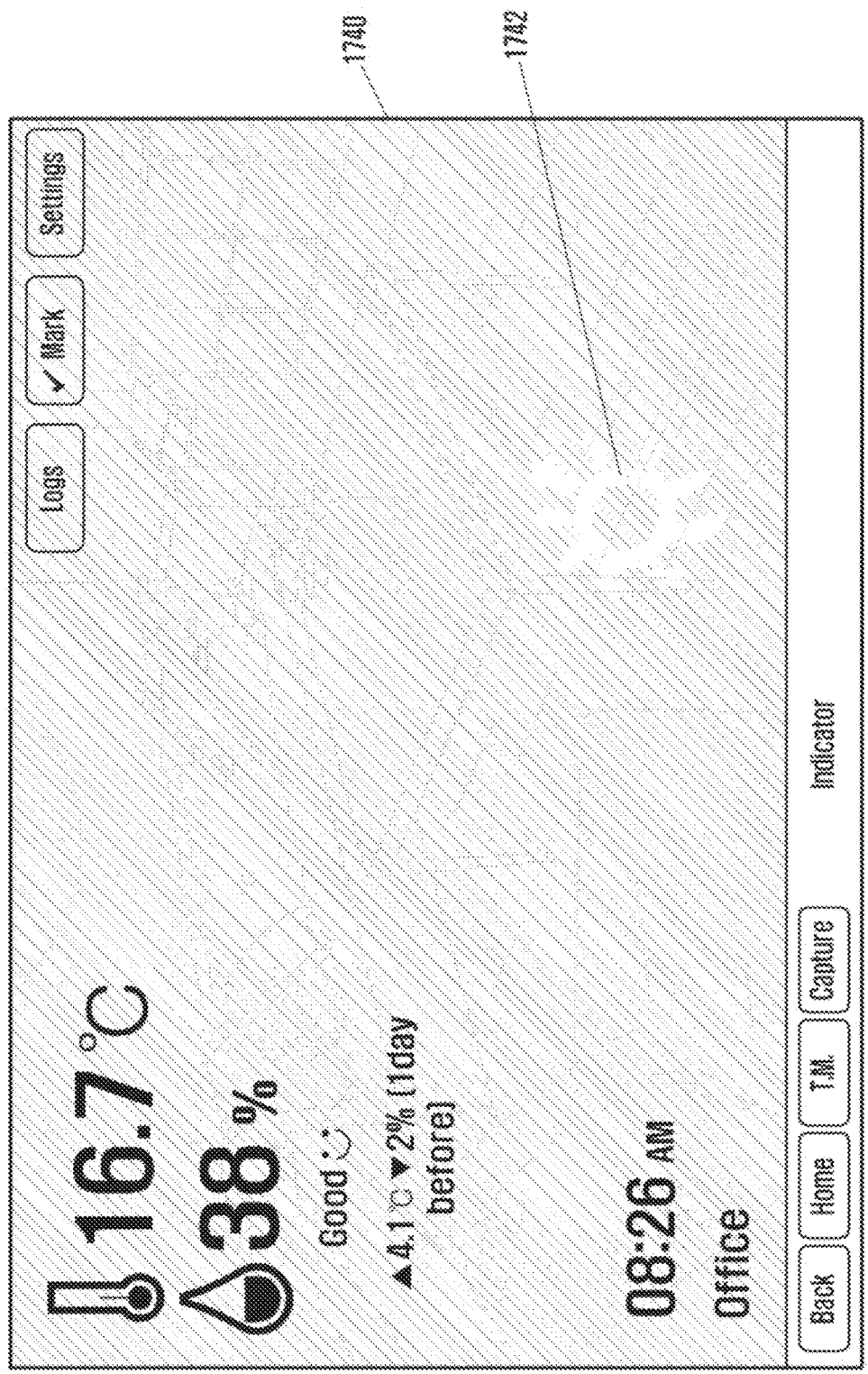

FIG. 17A shows that a user's finger 1710 forms a path 1712 of a touch and drag action on the first layer 1700. This path 1712 is displayed transparently on the first layer 1700. FIG. 17B shows that a user's finger further forms another path 1724 of a touch and drag action on the first layer 1720. At this time, the previously formed path 1722 is displayed opaquely due to changed transparency as time passes. FIG. 17C shows that a user's finger further forms another path 1734 of a touch and drag action on the first layer 1730. At this time, the previously formed path 1732 is displayed opaquely due to changed transparency as time passes. Additionally, the firstly formed path (1722 in FIG. 17B) is completely invisible having assumed the same opacity as the surrounding first layer. FIG. 17D shows a further elapse of time. The finally formed path 1742 only is displayed on the first layer 1740, and the other paths previously formed are completely invisible.

As time passes, a display on the first layer is changed sequentially. Also, several paths disappear gradually in the order of being formed as shown in FIGS. 17A to 17D. Namely, the firstly formed path 1712 disappears first and the finally formed path 1724 disappears lastly.

Figure 18A:
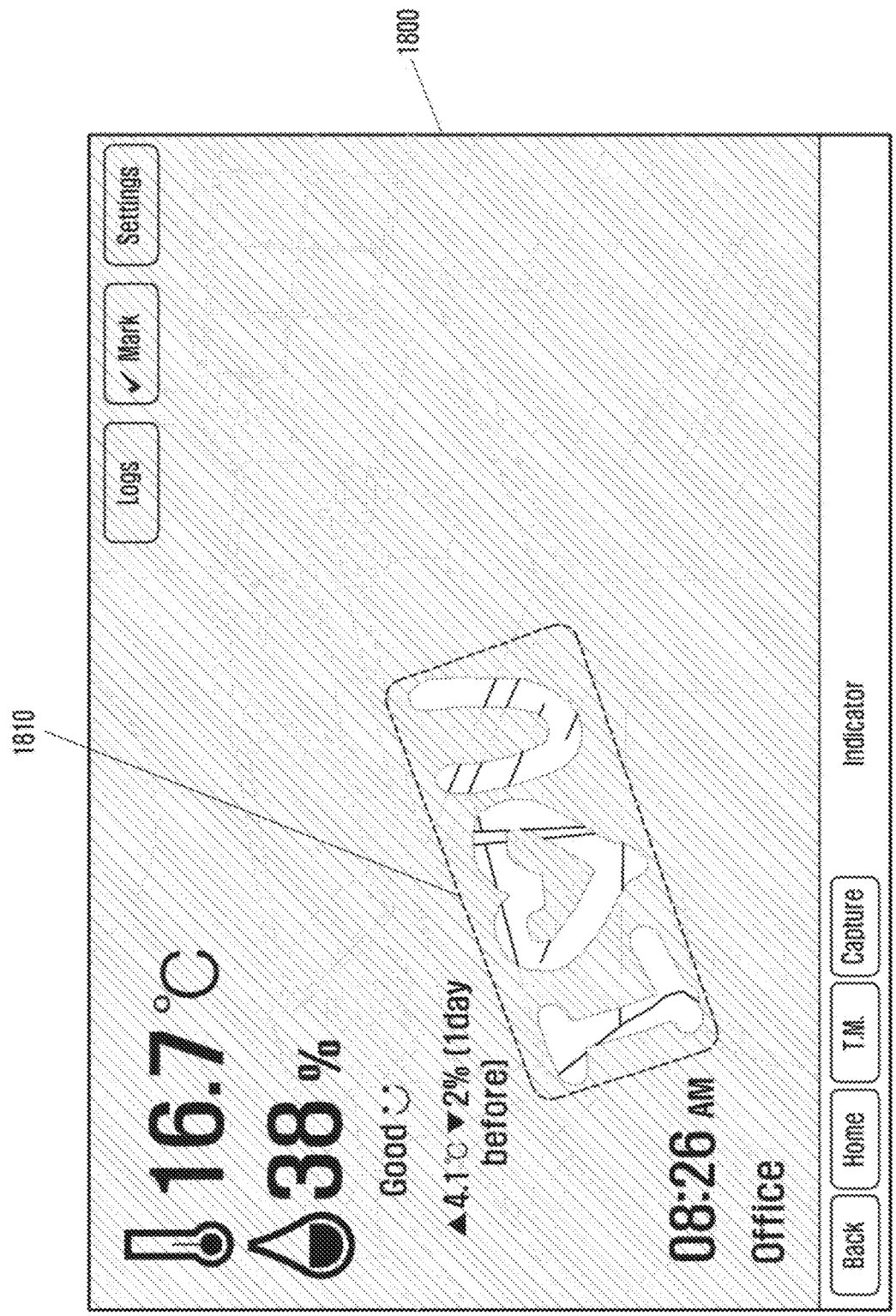
Figure 18C:
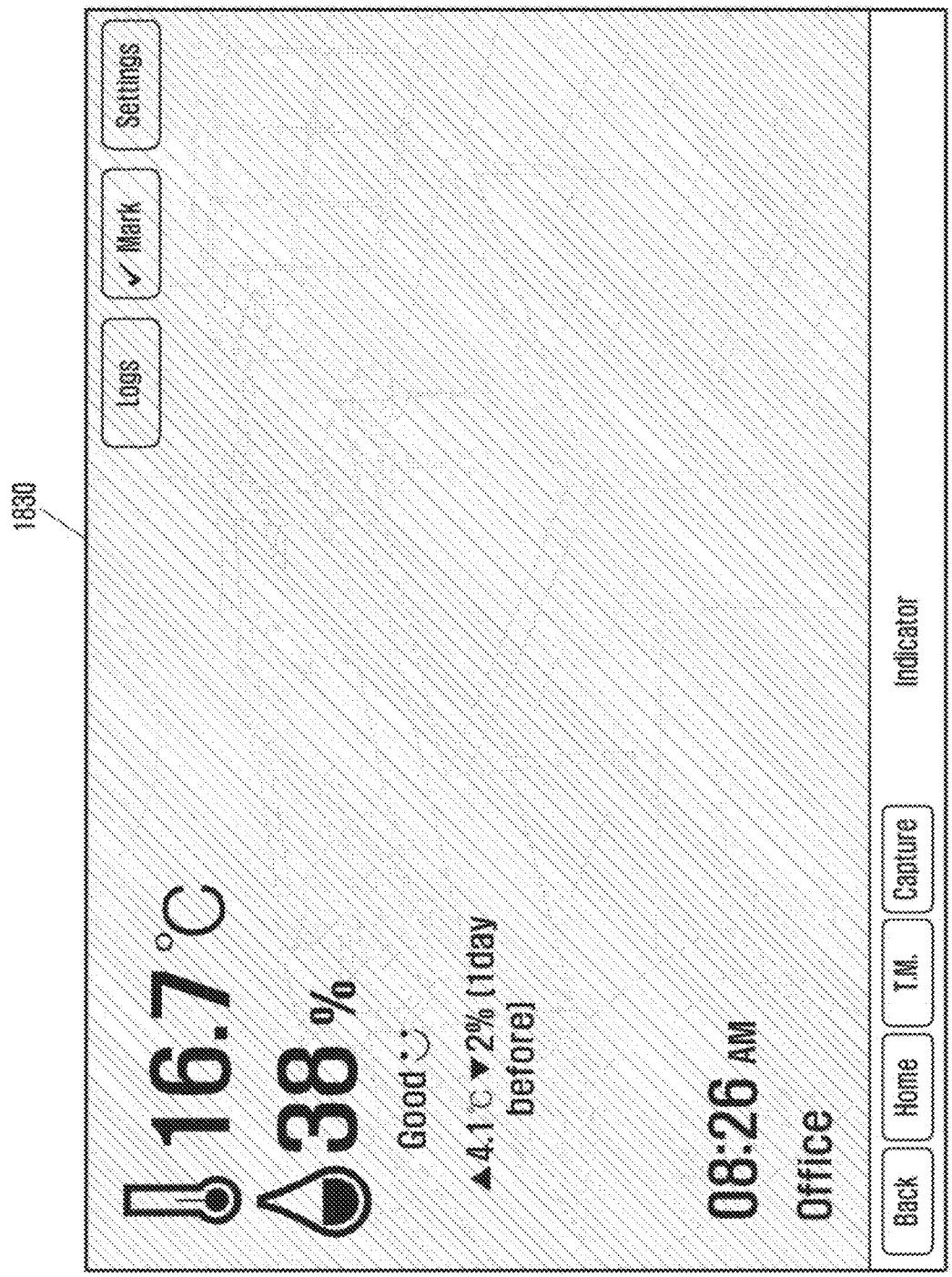

FIGS. 18A to 18C show screenshots illustrating a layer changed in opacity in a case of a touch and drag action taken at about 90% regions on a touch screen of an electronic device according to an embodiment of the present disclosure.

Referring to FIGS. 18A to 18C, a user's finger (not shown) forms a path 1810 of a contact region on the first layer 1800. Then the transparency of the contact path 1810 is changed. Further and continuous contact on the first layer 1800 increases a transparent region of the first layer. If a contact region occupies about 90% of the entire region of the first layer, the control unit 110 controls the entire region of the first layer to be in a semitransparent state.

FIG. 18A shows that the path 1810 caused by a touch and drag action is displayed transparently on the first layer 1800. FIG. 18B shows that about a 90% region of the first layer 1820 is displayed transparently. FIG. 18C shows that the entire region of the first layer 1830 returns to the initial semitransparent state due to the detection of a touch and drag action from about the 90% region of the first layer.

Figure 19:
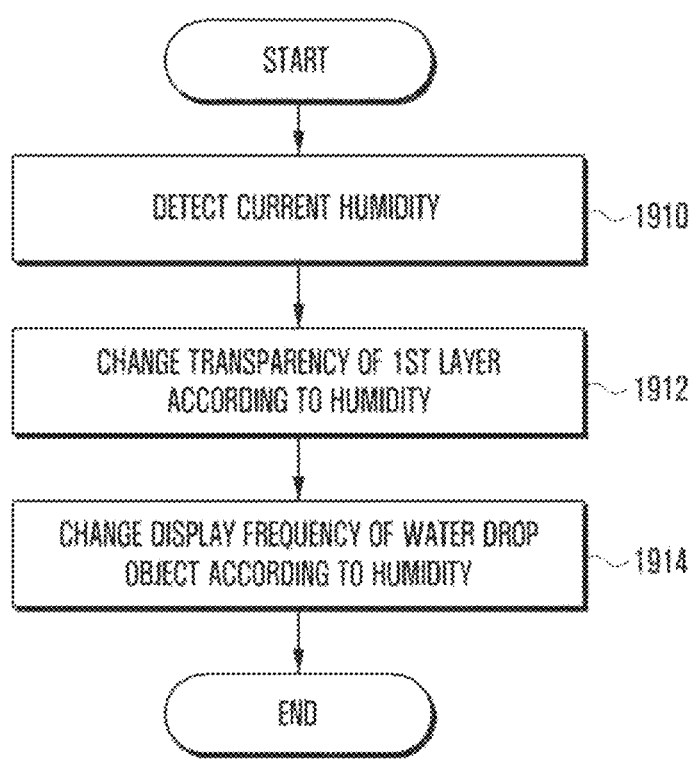
FIG. 19 is a flow diagram illustrating a process associated with humidity changes in an electronic device according to an embodiment of the present disclosure.

FIG. 19 is a flow diagram illustrating a process associated with humidity changes in an electronic device according to an embodiment of the present disclosure. FIGS. 20A to 20E show screenshots illustrating various display forms of a layer according to temperature and humidity changes on a touch screen of an electronic device according to an embodiment of the present disclosure.

Referring to FIGS. 1, 19, and 20A to 20E, the humidity sensor 172 detects a current humidity at operation 1910. Then the control unit 110 receives detection results from the humidity sensor 172 and determines humidity based on the detection results. At operation 1912, depending on the determined humidity, the control unit 110 may change transparency of the first layer which is in a semitransparent state.

Alternatively, such humidity may be determined based on data received from any external entity.

At operation 1914, depending on the determined humidity, the control unit 110 may change a display frequency of water drop objects displayed on the first layer. For example, in the case where the first layer has an attribute of 'water vapor', the control unit 110 may assign a higher display frequency to water drop objects and also increase a velocity of water drop objects being moved in the direction of gravity when the humidity is between 100% and 90%. If the humidity is between 90% and 20%, the control unit 110 may assign a slightly higher display frequency to water drop objects and also slightly increase a velocity of water drop objects being moved in the direction of gravity. If the humidity is between 20% and 10%, the control unit 110 may assign a lower display frequency to water drop objects and also decrease a velocity of water drop objects being moved in the direction of gravity. If the humidity is between 10% and 0%, the control unit 110 may assign a very lower or no display frequency to water drop Objects and also control water drop objects to be not moved in the direction of gravity.

For example, if the humidity is between 100% and 90%, ten water drop Objects are displayed on the touch screen. If the humidity is between 90% and 20%, five water drop objects are displayed on the touch screen. If the humidity is between 20% and 10%, one or two water drop objects are displayed on the touch screen. If the humidity is between 10% and 0%, no water drop object is displayed on the touch screen.

The control unit 110 may change transparency of the first layer, depending on humidity. For example, the control unit 110 may set transparency of the first layer to 30 when the humidity is between 100% and 90%. Also, the control unit 110 may set transparency of the first layer to 50 when the humidity is between 90% and 20%. And also, the control unit 110 may set transparency of the first layer to 70 when the humidity is between 20% and 10%. And also, the control unit 110 may set transparency of the first layer to 100 when the humidity is between 10% and 0%.

Figure 20A:
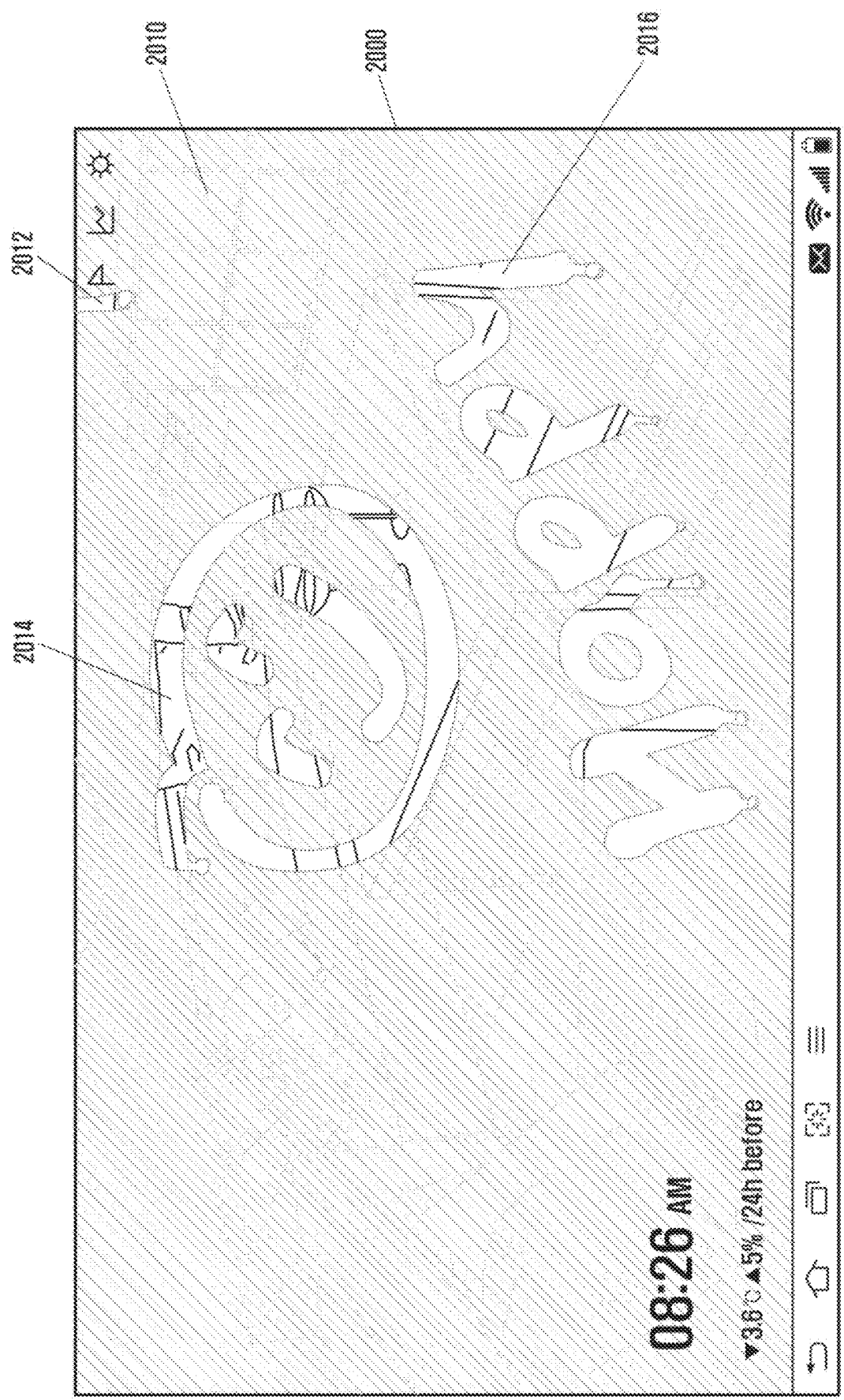
FIGS. 20A, 20B, 20C, 20D, and 20E show screenshots illustrating various display forms of a layer according to temperature and humidity changes on a touch screen of an electronic device according to an embodiment of the present disclosure.

FIG. 20A shows one case in which the humidity is between 100% and 90%. In this case, the first layer 2000 is displayed on the touch screen 190. Due to a higher humidity, the background image 2010 is seen dimly. The transparency of contact paths 2014 and 2016 formed by a user's finger (not shown) are changed. Water drop objects are formed at the contact paths 2014 and 2016. Another water drop object 2012 is displayed near an edge of the first layer 2000.

Figure 20B:
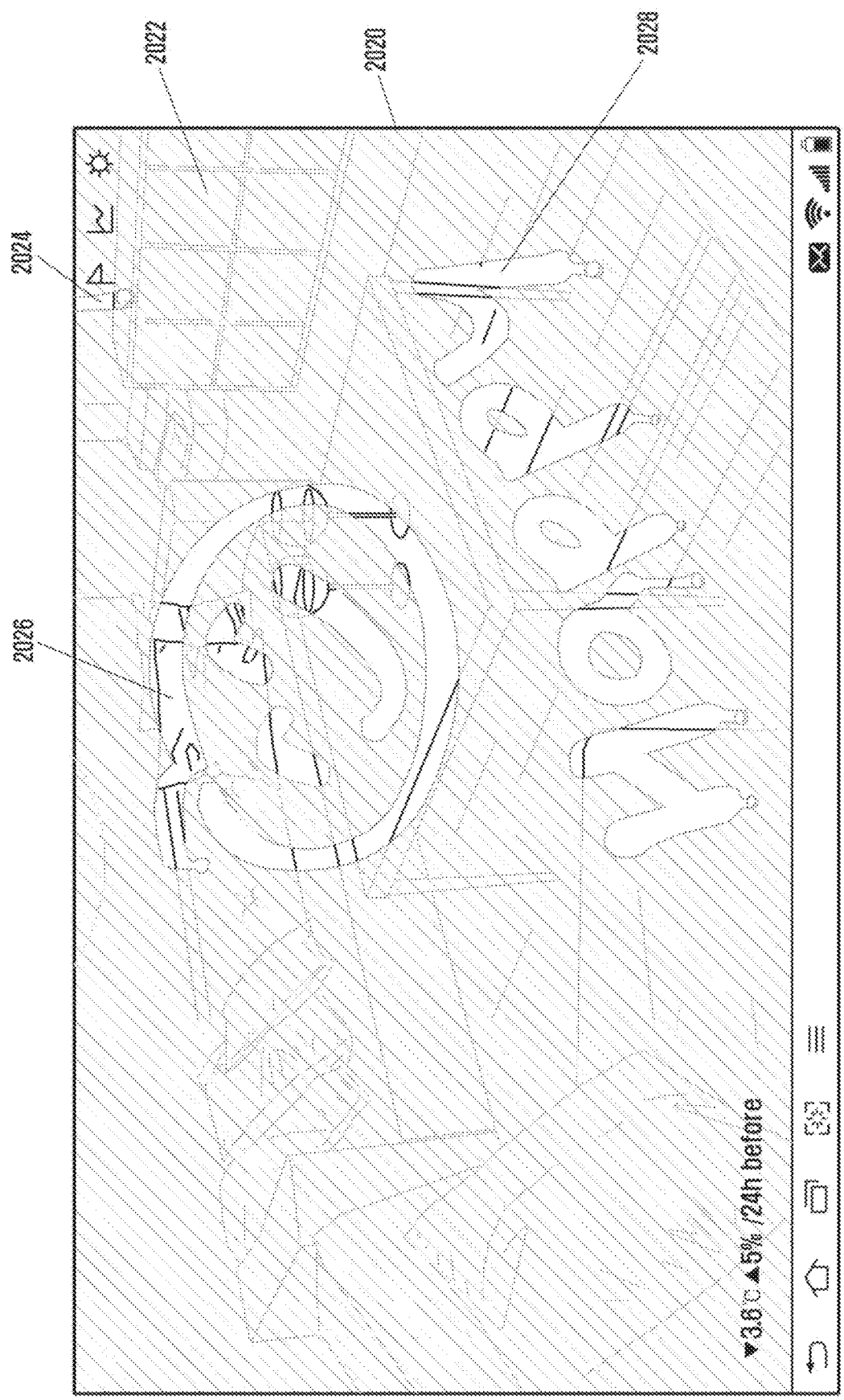

FIG. 20B shows another case in which the humidity is between 20% and 10%. In this case, contact paths 2026 and 2028 formed by a user's finger (not shown) are displayed on the first layer 2020. The background image 2022 is seen more clearly than the background image 2010 shown in FIG. 20A. Another water drop object 2024 is displayed near an edge of the first layer 2020. In the case where the humidity is between 20% and 10%, the control unit 110 may set transparency of the first layer to 70.

Figure 20C:
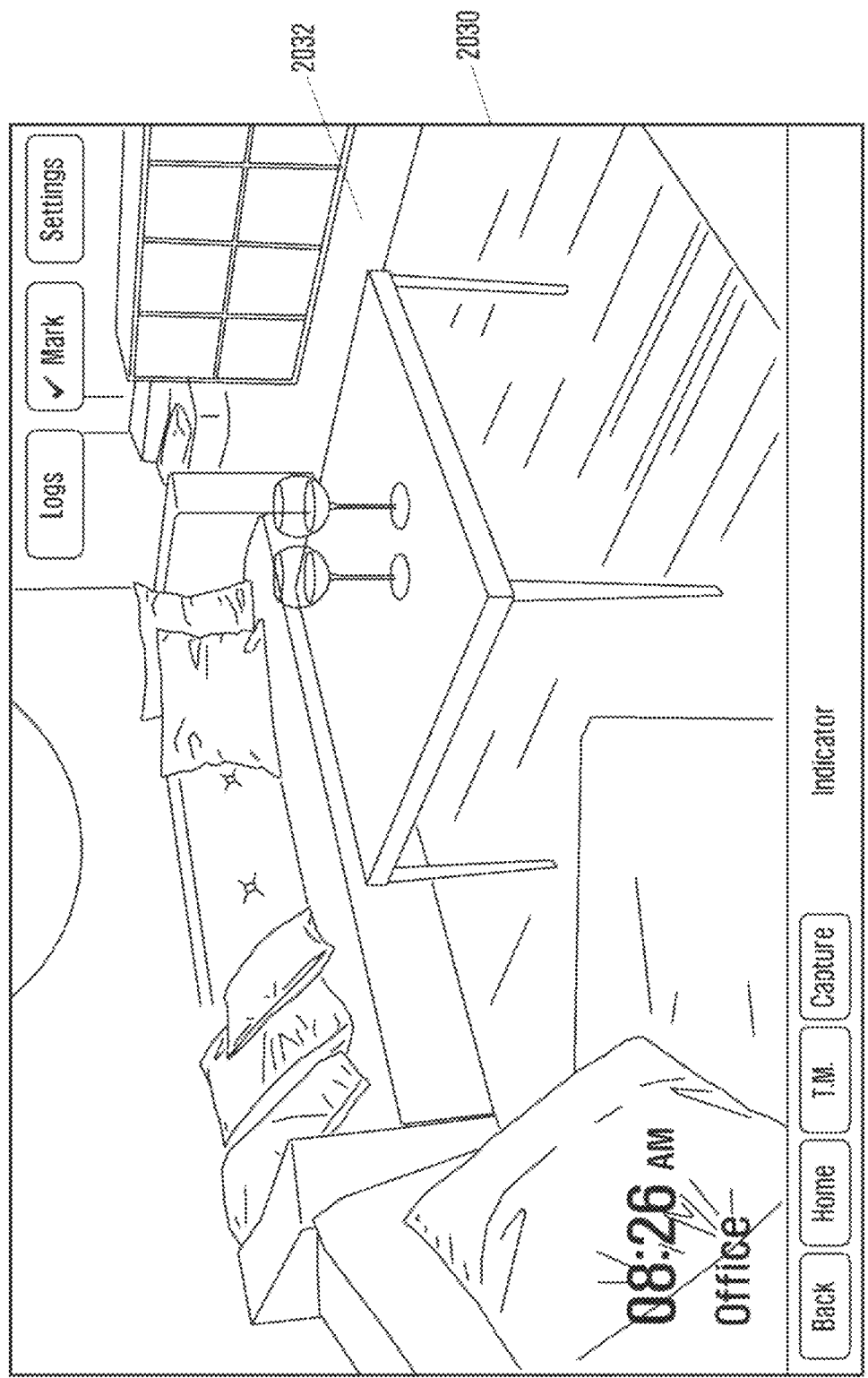

FIG. 20C shows still another case in which the humidity is 0%. In this case, the transparency of the first layer 2030 is changed, and the background image 2032 is seen clearly.

Figure 20D:
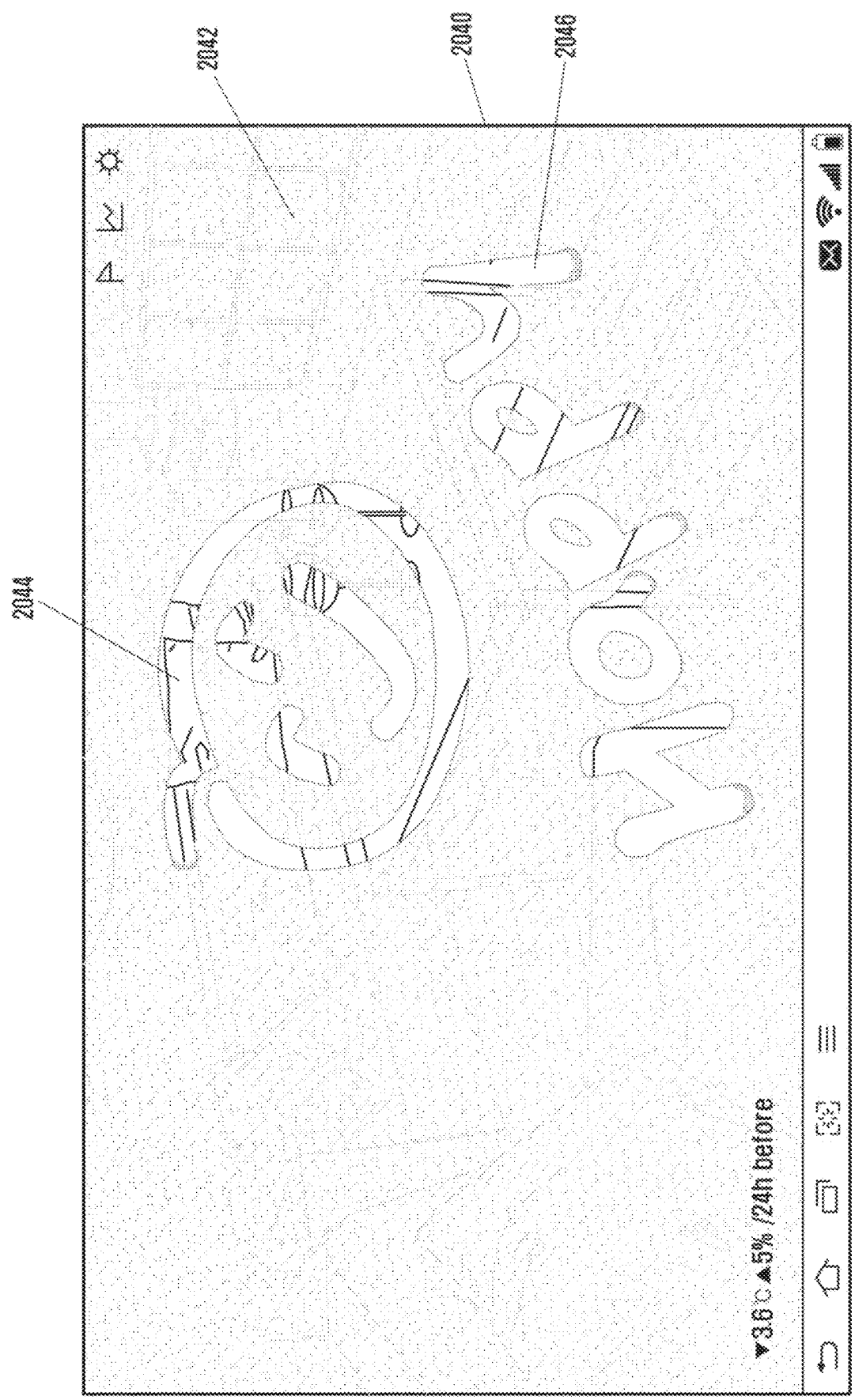

Meanwhile, in the case where the first layer has an attribute of 'frost', the control unit 110 may set transparency of the first layer to 50 when the humidity is between 100% and 20%. FIG. 20D shows the first layer 2040 in this case. Since the first layer 2040 has an attribute of 'frost', a frost image is displayed on the first layer 2040 and the background image 2042 is seen dimly. If a user's finger takes a touch and drag action on the touch screen 190, resultant paths 2044 and 2046 are displayed transparently on the first layer 2040.

Figure 20E:
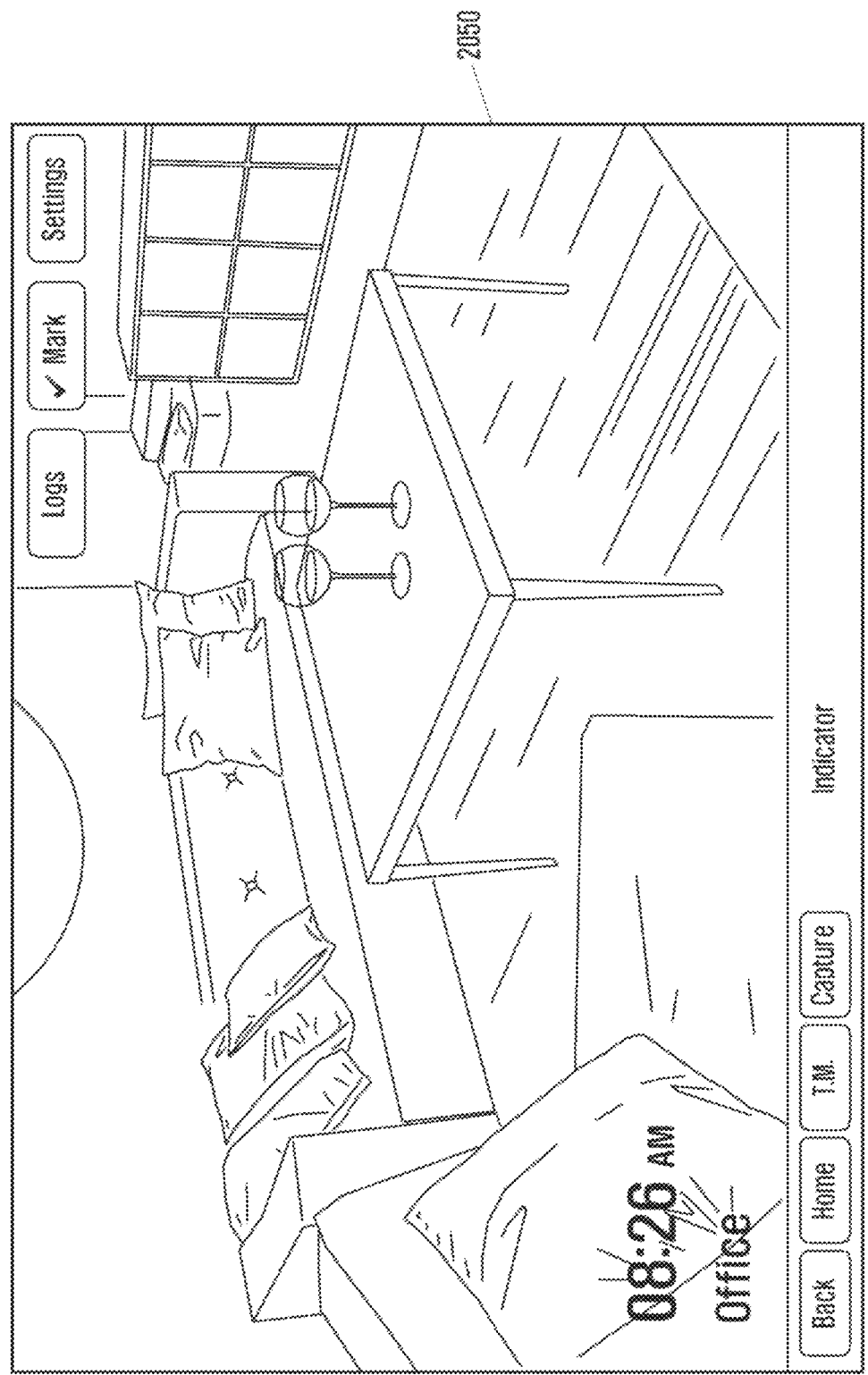

FIG. 20E shows the first layer 2050 displayed on the touch screen in this case. If the humidity is between 10% and 0%, the control unit 110 may set transparency of the first layer 2050 for 100.

In the case where the first layer has an attribute of 'frost', the control unit 110 may create no water drop object.

Figure 21:
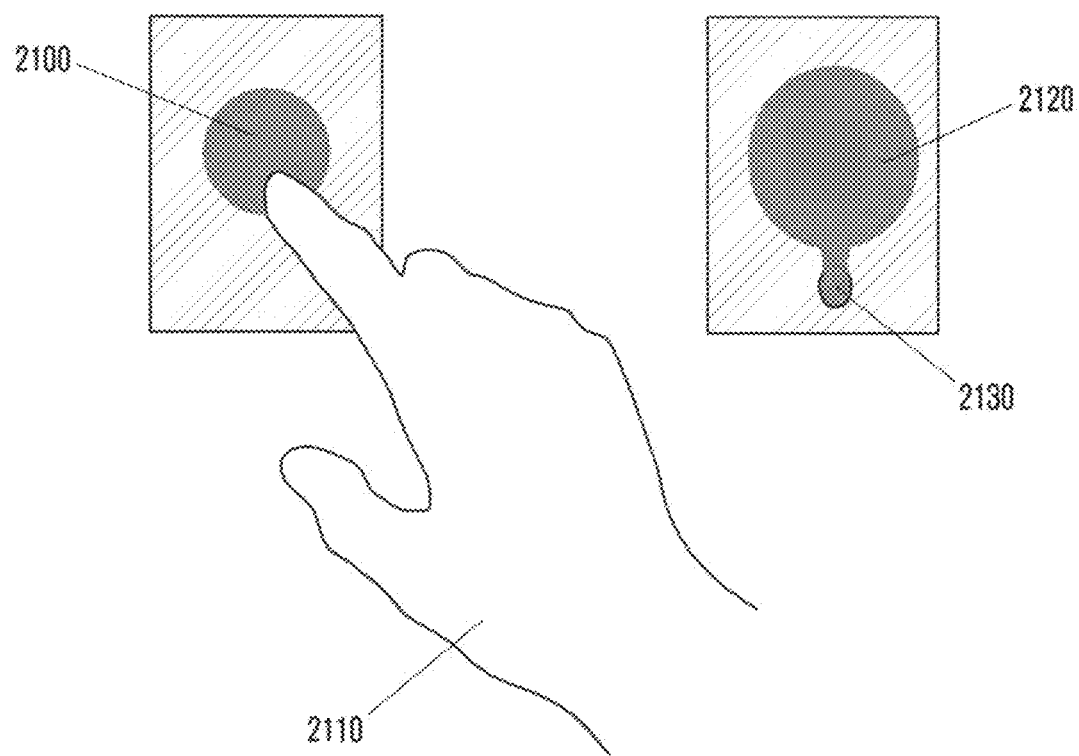
FIG. 21 is a view illustrating a variation in a display form of a layer at a touch point according to the duration of a touch on a touch screen of an electronic device according to an embodiment of the present disclosure.

FIG. 21 is a view illustrating a variation in a display form of a layer at a touch point according to the duration of a touch on a touch screen of an electronic device according to an embodiment of the present disclosure.

Referring to FIG. 21, when a user's finger 2110 comes in contact with the first layer displayed on the touch screen, the transparency of a contact point 2100 is changed. If the user's finger 2110 keeps such contact for a given time, a region having been changed in transparency is gradually enlarged. Namely, the contact point 2100 having been changed in transparency by the initial finger contact is shifted to an enlarged point 2120 as time passes. Further, the control unit may create a water drop object 2130 displayed on the first layer.

The touch screen 190 detects contact of a user's finger from the first layer displayed thereon. Then the control unit 110 receives coordinates of a contact region from the touch screen 190 and, based on the received coordinates, determines a specific region to have its transparency changed. Further, the control unit 110 controls the touch screen 190 to change transparency of the contact region. Therefore, the partial region 2100 of the first layer is displayed transparently. Additionally, the control unit 110 detects if the finger contact is maintained continuously. If the finger contact is maintained without movement for a given time, the control unit 110 may enlarge such a transparently displayed region on the first layer.

For example, if an initial region having its transparency changed by a finger contact has a size of 70, this region may be enlarged to a size of 100 due to continuous finger contact on the touch screen.

FIGS. 22A to 22D show screenshots illustrating a process of releasing a lock state of a user interface in response to a user input on a touch screen of an electronic device according to an embodiment of the present disclosure.

The electronic device of this disclosure may include the display unit configured to display the user interface and having the touch screen. Further, the electronic may include the control unit configured to keep a lock state of the user interface by controlling the touch screen to display a semitransparent layer overlapped with the user interface, to change transparency of a partial region of the semitransparent layer when the user input is detected from the partial region, and to release the lock state of the user interface when the partial region occupies a specific percentage or more of the entire region of the touch screen.

Figure 22A:
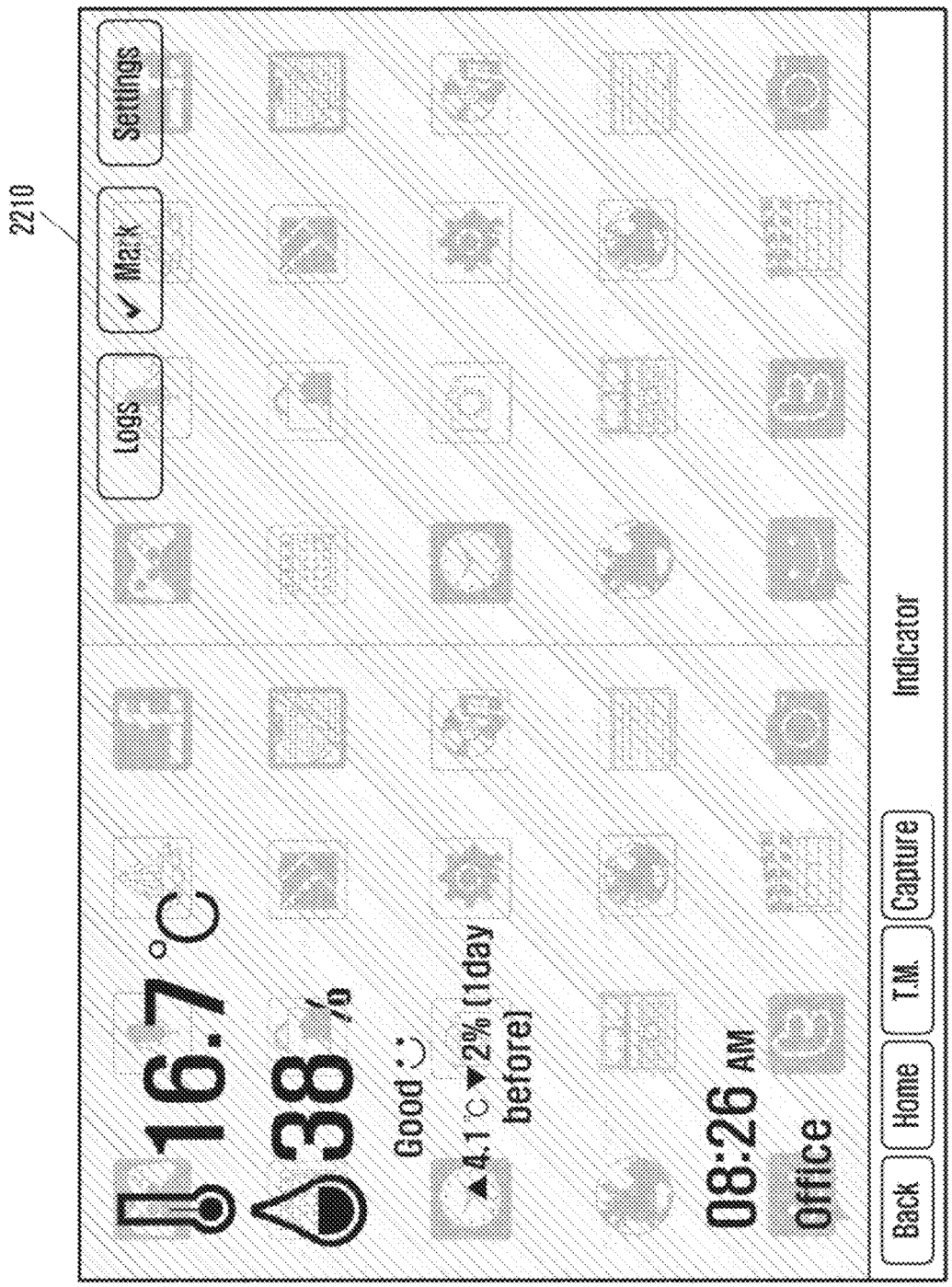
FIGS. 22A, 22B, 22C, and 22D show screenshots illustrating a process of releasing a lock state of a user interface in response to a user input on a touch screen of an electronic device according to an embodiment of the present disclosure.

Referring to FIGS. 1 and 22A, the first layer 2210 is displayed in a semitransparent state on the touch screen 190. A plurality of icons for executing applications are arranged behind the first layer 2210 and displayed dimly. In the case where the entire region of the first layer 2210 is in a semitransparent state, the control unit 110 may disallow the selection of such icons. For example, even if one of icons displayed dimly behind the first layer 2210 is touched, the touched icon is not selected and thus a corresponding application is not executed.

Returning to FIG. 2B, the touch screen 190 may display the above-discussed image 292 on which a plurality of icons are arranged. Hereinafter, this image 292 will be referred to as a desktop image. When one of such icons is touched and thereby selected, a specific application linked to the selected icon may be executed. Namely, the plurality of icons may act as a sort of user interface.

Returning to FIG. 22A, in the case where the first layer 2210 is displayed in a semitransparent state and overlapped with the desktop image, the control unit 110 may keep the user interface in a lock state. The user interface may be shifted from a lock state to an unlock state, and vice versa, under the control of the control unit 110.

Figure 22B:
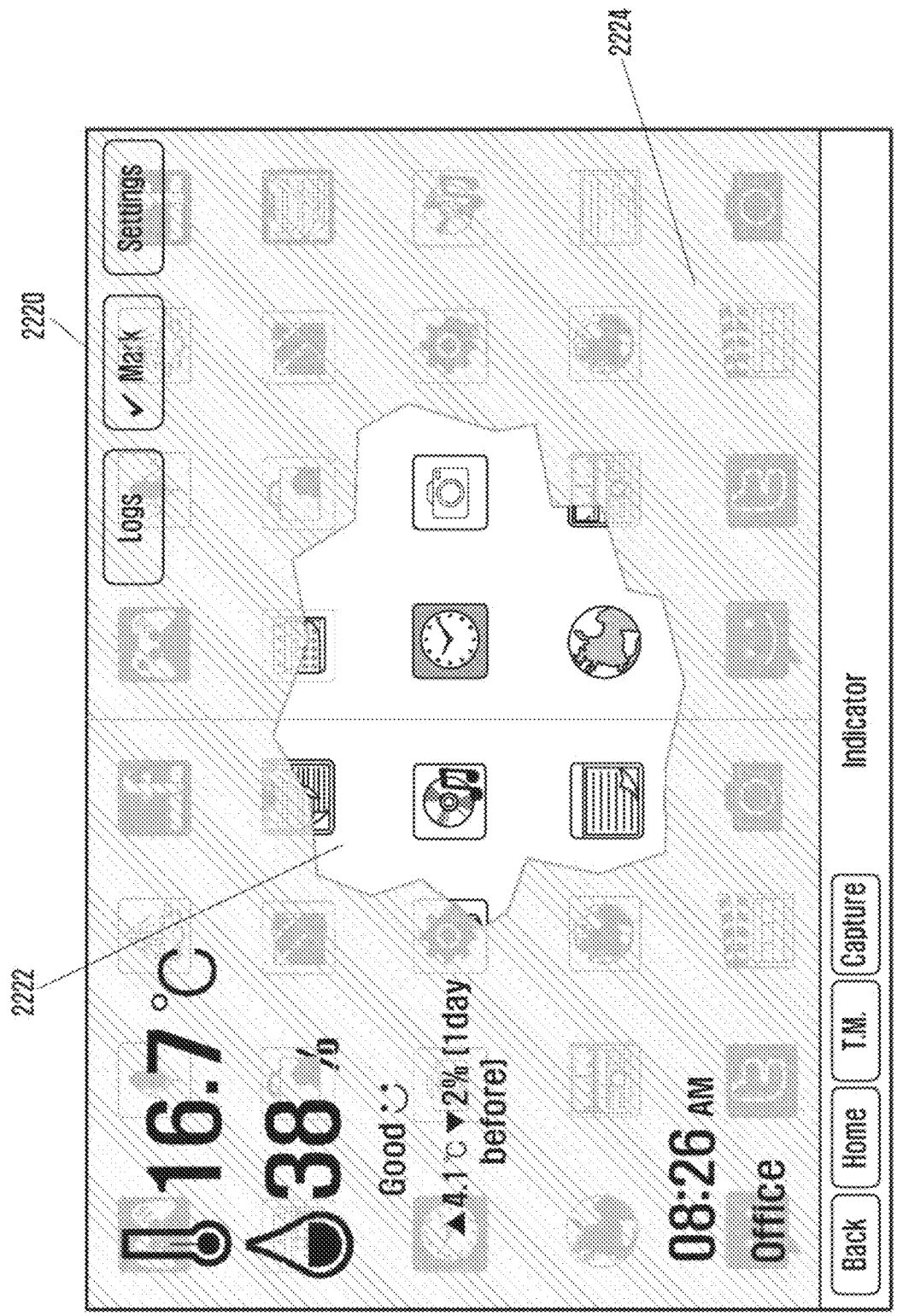

Referring to FIG. 22B, the first layer 2220 is displayed in a semitransparent state on the touch screen 190. A user interface having a plurality of icons arranged thereon is displayed behind the first layer 2220. If a touch and drag action happens on the first layer 2220, the control unit 110 receives coordinates of a touch and drag region 2222 from the touch screen 190. Then the control unit 110 changes transparency of the touch and drag region 2222 such that the region 2222 is in a transparent state. Therefore, some icons behind the first layer 2220 are displayed clearly in the transparent region 2222. In the end, the first layer 2220 comes to contain the transparent region 2222 and the semitransparent region 2224, depending on a user input. When the transparent region 2222 occupies 90% or more of the entire region, the control unit 110 may shift a lock state of the user interface to an unlock state.

Figure 22C:
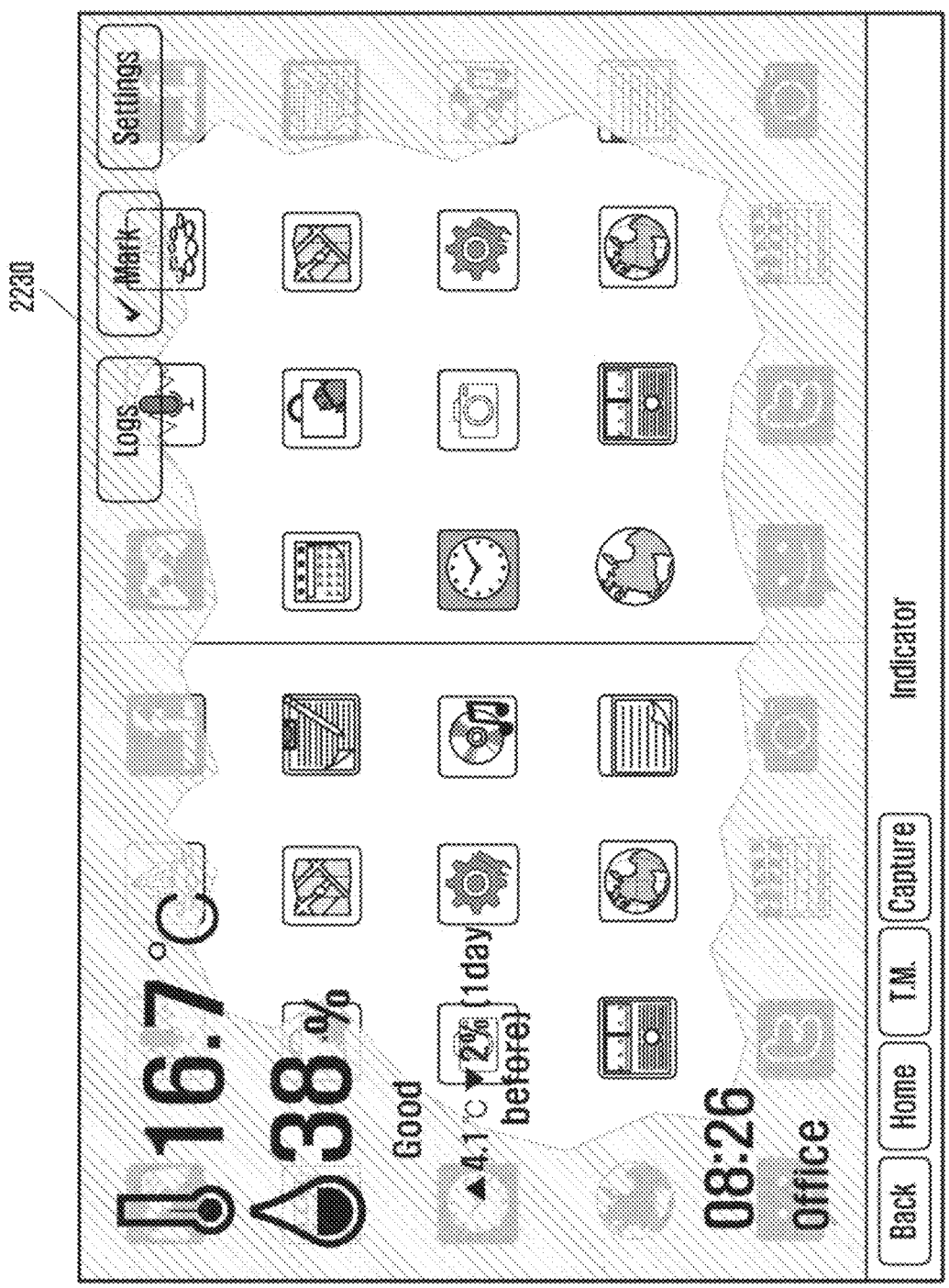

Referring to FIG. 22C, most regions of the first layer 2230 displayed on the touch screen 190 are in a transparent state, and the other peripheral regions are in a semitransparent state. If the transparent region occupies 90% or more of the first layer 2230, the control unit 110 may shift a lock state of the user interface to an unlock state.

Figure 22D:
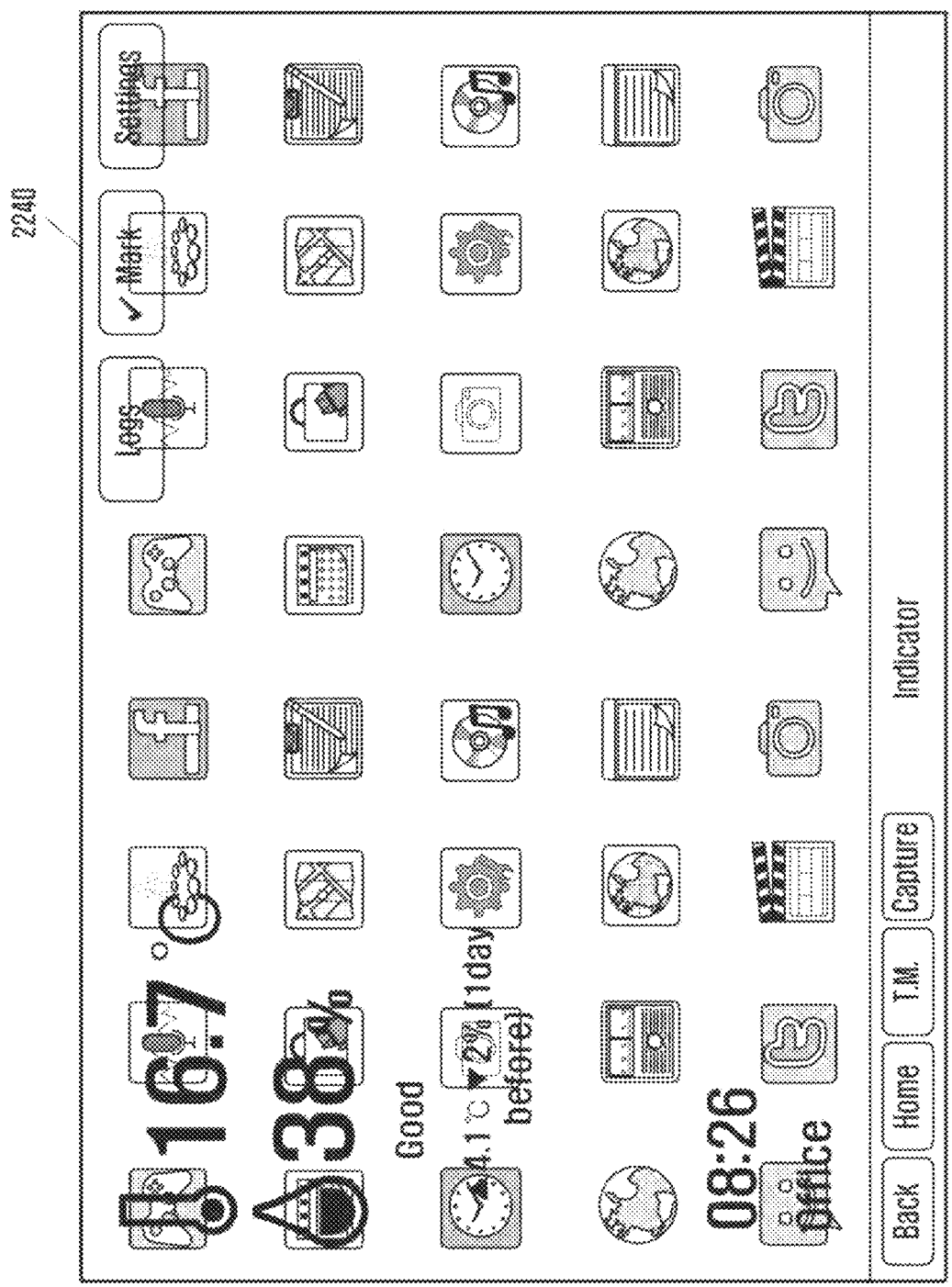

FIG. 22D shows a screen of user interface which is in an unlock state. The first layer (not shown) di splayed transparently on the touch screen 190, so that a desktop image 2240 having icons arranged thereon is seen clearly. Therefore, a user can touch a desired one of icons arranged on the desktop image 2240 in order to execute a corresponding application.

Figure 23A:
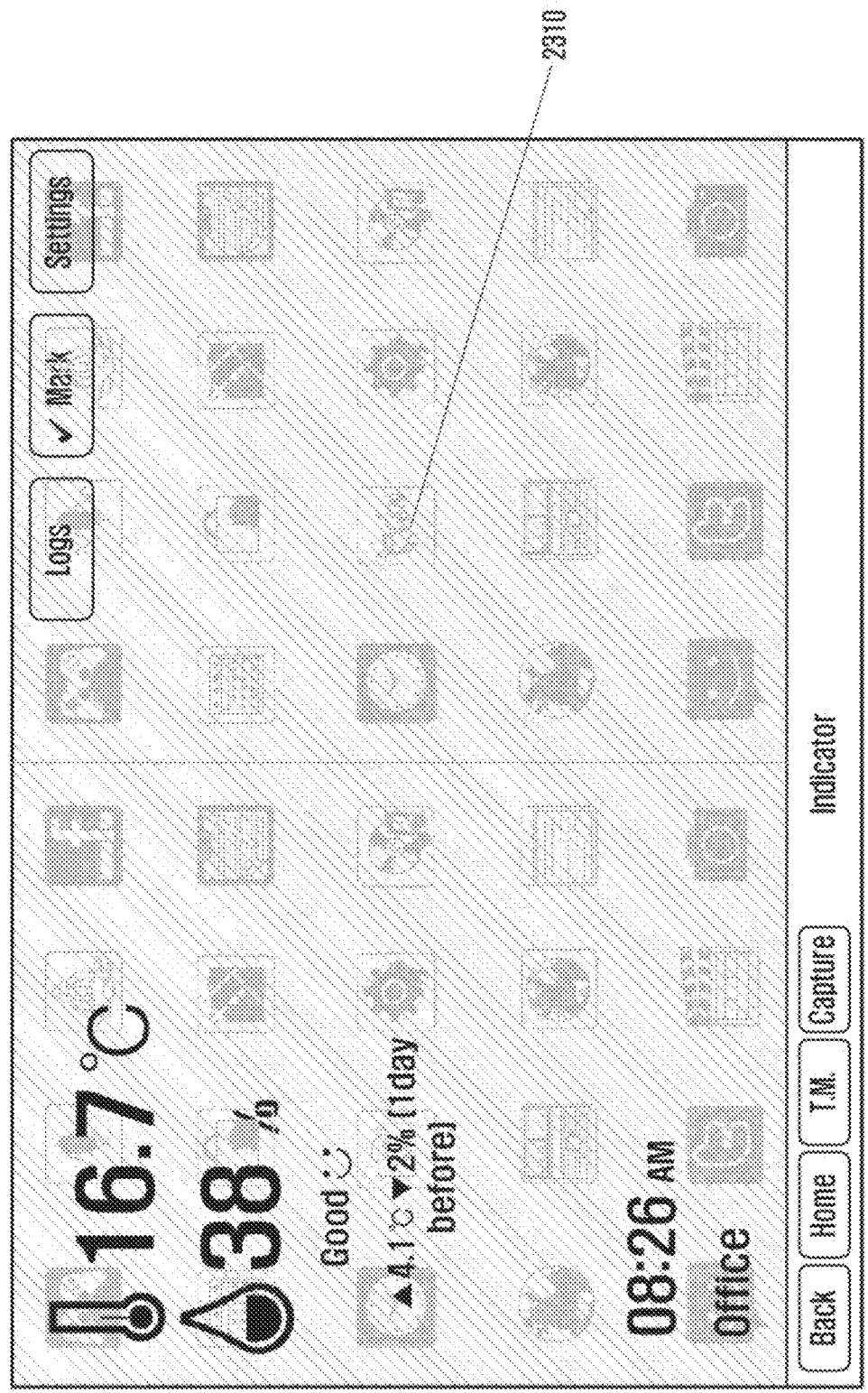
Figure 23C:
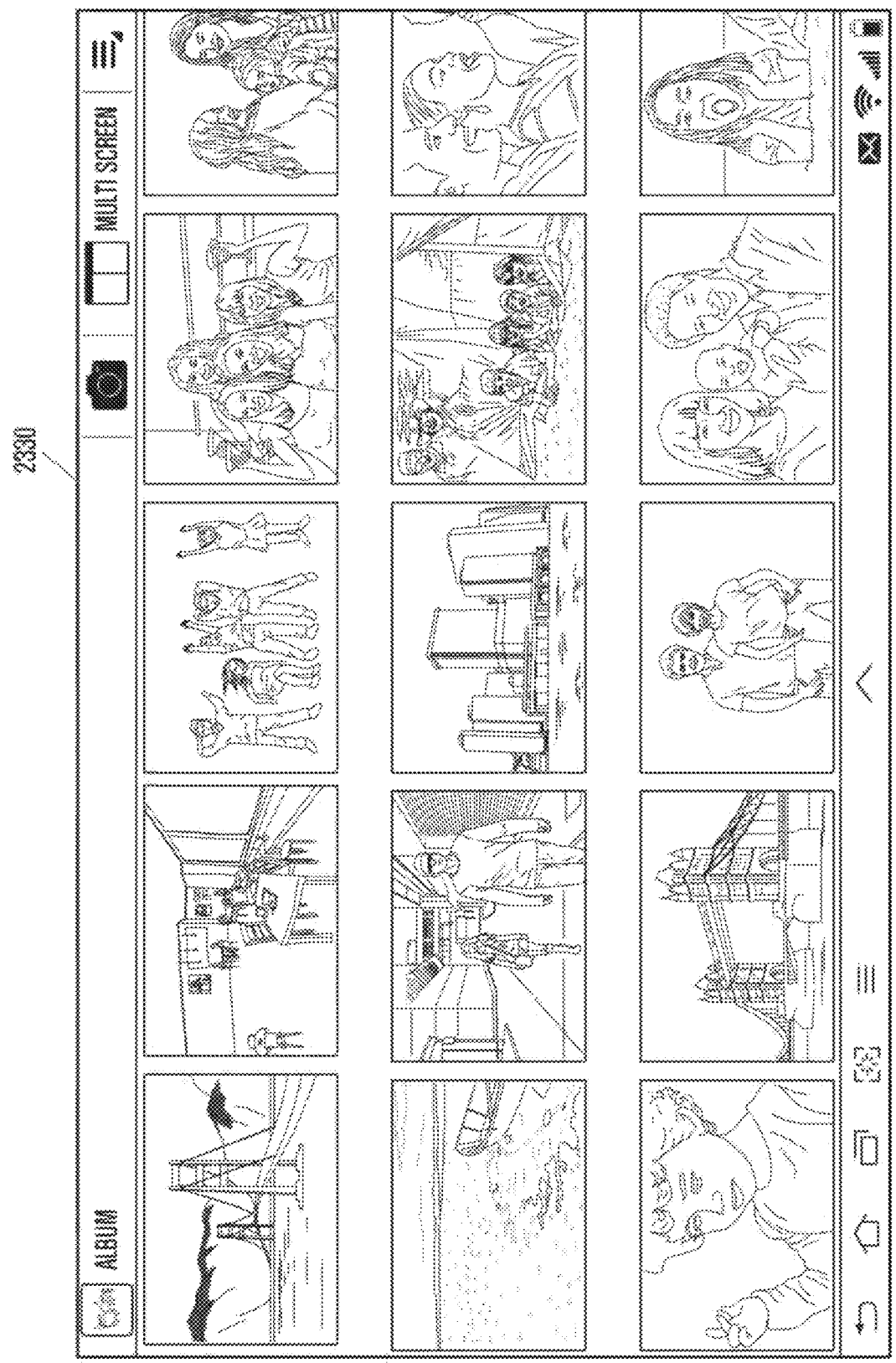

FIGS. 23A to 23C show screenshots illustrating a process of releasing a lock state of a user interface at a partial region on a touch screen of an electronic device according to an embodiment of the present disclosure.

The electronic device may include the display unit configured to display a plurality of icons for executing applications and to have the touch screen for detecting a user input. Further, the electronic device may include the control unit configured to disallow a selection of the icons by controlling the touch screen to display a semitransparent layer overlapped with the icons, and to control at least one of the icons to be in a selectable state by changing transparency of a partial region of the semitransparent layer when the user input is detected from the partial region.

Referring to FIGS. 1 and 23A, a desktop image having a plurality of icons arranged thereon is displayed on the touch screen 190, and the first layer is displayed thereon in a semitransparent state. The icons are displayed dimly due to the first layer. In the case where the entire region of the first layer is in a semitransparent state, the control unit 110 may keep a user interface in a lock state. For example, even if one icon 2310 displayed dimly behind the first layer is touched, the touched icon 2310 is not selected due to a lock state of the user interface.

Referring to FIG. 23B, a desktop image having a plurality of icons arranged thereon is displayed on the touch screen 190, and the first layer 2320 is displayed thereon in a semitransparent state. The first layer 2320 may contain a transparent region 2322 and a semitransparent region 2324. The transparent region 2322 receiving a user input is changed from a semitransparent state to a transparent state, while the semitransparent region 2324 receiving no user input is still in a semitransparent state. Some icons are located in the transparent region 2322 and displayed clearly in comparison with the other icons located behind the semitransparent region 2324. The control unit 110 may control such icons located in the transparent region 2322 to be selected. Namely, if the transparency of a partial region of the first layer 2320 is changed in response to a user input, the control unit 110 may partially release a lock state of the user interface. Namely, the transparent region 2322 only is entered in an unlock state. Therefore, if a certain icon 2326 located in the transparent region 2322 is touched and thereby selected, the control unit 110 executes a specific application linked to the selected icon 2326.

FIG. 23C shows a particular screen 2330 of the application executed when the visible icon (2326 in FIG. 23B) is selected. Namely, when a gallery icon 2326 is selected as shown in FIG. 23B, a gallery application screen 2330 is displayed.

The above-discussed method is described herein with reference to flowchart illustrations of user interfaces, methods, and computer program products according to various embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a non-transitory computer usable or computer-readable memory that can direct a computer or other programmable data processing apparatus to function in a particular manner, such that the instructions stored in the non-transitory computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a touch screen; and
    at least one processor configured to:
        control the touch screen to display an image, and
        control the touch screen to display a first layer in a semitransparent state overlapping the image, wherein a graphic object corresponding to conditions of the electronic device is displayed opaquely on at least part of the first layer,
    wherein, when a user input via the touch screen is detected, the at least one processor is further configured to change a degree of transparency of a partial region of the first layer corresponding to the user input while the first layer continues to overlap the image, such that a part of the image underlying the partial region corresponding to the user input is clearly transparent.

2. The electronic device of claim 1, further comprising:
    a temperature sensor,
    wherein the at least one processor is further configured to:
        determine temperature based on information received from the temperature sensor,
        control the first layer to display a water vapor image when the determined temperature is higher than a predefined temperature, and
        control the first layer to display a frost image when the determined temperature is lower than the predefined temperature.

3. The electronic device of claim 2, wherein the at least one processor is further configured to change the degree of transparency of an entire region of the first layer according to variations of the determined temperature.

4. The electronic device of claim 1, wherein the at least one processor is further configured to control the first layer to display a water drop object after an elapse of a given time.

5. The electronic device of claim 4, wherein the at least one processor is further configured to control the water drop object to be displayed as if it moves in a direction of gravity.

6. The electronic device of claim 4, wherein the at least one processor is further configured to control the water drop object to be displayed at a removal point of the user input.

7. The electronic device of claim 1, wherein the at least one processor is further configured to change the degree of transparency of a user input detected region as time passes.

8. The electronic device of claim 1, further comprising:
    a humidity sensor,
    wherein the at least one processor is further configured to change the degree of transparency of the first layer in response to a signal received from the humidity sensor.

9. The electronic device of claim 1, wherein the at least one processor is further configured to:
    determine temperature based on data received from an external entity, to control the first layer to display a water vapor image when the determined temperature is higher than a predefined temperature, and
    control the first layer to display a frost image when the determined temperature is lower than the predefined temperature.

10. The electronic device of claim 1, wherein the at least one processor is further configured to change the degree of transparency of an entire region of the first layer according to weather information.

11. The electronic device of claim 1, wherein the at least one processor is further configured to:
    release a lock state of a user interface when the partial region occupies a specific percentage or more of an entire region of the touch screen.

12. An electronic device comprising:
    a touch screen; and
    at least one processor configured to:
        control the touch screen to display a plurality of icons for executing applications,
        disallow a selection of the plurality of icons by controlling the touch screen to display a semitransparent layer overlapping the plurality of icons, wherein a graphic object corresponding to conditions of the electronic device is displayed opaquely on at least part of the semitransparent layer, and
        control, when a user input is detected, at least one of the plurality of icons to be in a selectable state by changing a degree of transparency of a partial region of the semitransparent layer corresponding to the user input while the semitransparent layer continues to overlap the plurality of icons, such that a part of the plurality of icons underlying the partial region corresponding to the user input is clearly transparent.

13. A method for a display control for a screen of an electronic device having a touch screen, the method comprising:
    displaying a first layer in a semitransparent state overlapping an image displayed on the touch screen, wherein graphic object corresponding to conditions of the electronic device is displayed opaquely on at least part of the first layer;
    detecting a user input on the touch screen to define a partial region; and
    changing a degree of transparency of the partial region of the first layer corresponding to the user input while the first layer continues to overlap the image, such that a part of the image underlying the partial region corresponding to the user input is clearly transparent.

14. The method of claim 13, further comprising:
    determining temperature;
    displaying a water vapor image on the first layer when the determined temperature is higher than a predefined temperature; and
    displaying a frost image on the first layer when the determined temperature is lower than the predefined temperature.

15. The method of claim 14, further comprising:
    changing the transparency of an entire region of the first layer according to variations of the determined temperature.

16. The method of claim 13, further comprising:
    changing the transparency of a user input detected region as time passes.

17. The method of claim 13, further comprising:
    detecting humidity; and
    changing transparency of the first layer according to the detected humidity.

18. The method of claim 13, further comprising:
    receiving temperature;
    displaying a water vapor image on the first layer when the received temperature is higher than a predefined temperature; and
    displaying a frost image on the first layer when the received temperature is lower than the predefined temperature.

19. The method of claim 13, further comprising:
    changing the transparency of an entire region of the first layer according to weather information.

20. The method of claim 13, further comprising:
releasing a lock state of a user interface when the partial region occupies a specific percentage or more of an entire region of the touch screen.

21. The electronic device of claim 1, wherein the changing the degree of transparency of the first layer at the partial region defined by the user input comprises changing the degree of transparency at a specific spot on the touch screen from which the user input is detected.

22. The electronic device of claim 1, wherein the degree of transparency is expressed from numbers 0 to 100.

* * * * *